US011783864B2

(12) United States Patent
Holzer et al.

(10) Patent No.: US 11,783,864 B2
(45) Date of Patent: Oct. 10, 2023

(54) INTEGRATION OF AUDIO INTO A MULTI-VIEW INTERACTIVE DIGITAL MEDIA REPRESENTATION

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Vladimir Roumenov Glavtchev, Mountain View, CA (US); Alexander Jay Bruen Trevor, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 268 days.

(21) Appl. No.: 14/861,019

(22) Filed: Sep. 22, 2015

(65) Prior Publication Data

US 2017/0084293 A1    Mar. 23, 2017

(51) Int. Cl.
*G11B 27/00*    (2006.01)
*G11B 27/32*    (2006.01)
(Continued)

(52) U.S. Cl.
CPC ............ *G11B 27/32* (2013.01); *G06F 16/686* (2019.01); *G11B 27/10* (2013.01); *G11B 27/322* (2013.01); *H04N 13/349* (2018.05)

(58) Field of Classification Search
CPC . G06F 17/30752; G06F 16/686; G11B 27/32; G11B 27/322; G11B 27/10;
(Continued)

(56) References Cited

U.S. PATENT DOCUMENTS 2,534,821 A    12/1950    Ifield
5,495,576 A    2/1996    Ritchey
(Continued)

FOREIGN PATENT DOCUMENTS

CN    104462365 A    3/2015
CN    105849781 A    8/2016
(Continued)

OTHER PUBLICATIONS

"International Application Serial No. PCT/US 16/52192, Int'l Search Report and Written Opinion dated Dec. 12, 2016", 8 pages.
(Continued)

*Primary Examiner* — Cesar B Paula
*Assistant Examiner* — David Faber
(74) *Attorney, Agent, or Firm* — Kwan & Olynick LLP

(57) ABSTRACT

Various embodiments of the present invention relate generally to systems and methods for integrating audio into a multi-view interactive digital media representation. According to particular embodiments, one process includes retrieving a multi-view interactive digital media representation that includes numerous images fused together into content and context models. The process next includes retrieving and processing audio data to be integrated into the multi-view interactive digital media representation. A first segment of audio data may be associated with a first position in the multi-view interactive digital media representation. In other examples, a first segment of audio data may be associated with a visual position or the location of a camera in the multi-view interactive digital media representation. The audio data may be played in coordination with the multi-view interactive digital media representation based on a
(Continued)

user's navigation through the multi-view interactive digital media representation, where the first segment is played when the first position or first visual position is reached.

20 Claims, 7 Drawing Sheets

(51) Int. Cl.
  *G06F 16/68* (2019.01)
  *G11B 27/10* (2006.01)
  *H04N 13/349* (2018.01)

(58) Field of Classification Search
  CPC ............. H04N 13/004; H04N 13/0066; H04N 13/0447; H04N 13/349
  USPC ......................................................... 715/203
  See application file for complete search history.

(56) References Cited

U.S. PATENT DOCUMENTS

| | | | |
|---|---|---|---|
| 5,557,684 A | 9/1996 | Wang | |
| 5,613,048 A | 3/1997 | Chen | |
| 5,613,056 A * | 3/1997 | Gasper | G06T 13/205 |
| | | | 345/473 |
| 5,694,533 A | 12/1997 | Richards | |
| 5,706,417 A | 1/1998 | Adelson | |
| 5,847,714 A | 12/1998 | Naqvi | |
| 5,850,352 A | 12/1998 | Moezzi | |
| 5,926,190 A | 7/1999 | Turkowski | |
| 6,031,564 A | 2/2000 | Ma | |
| 6,080,063 A | 6/2000 | Khosla | |
| 6,185,343 B1 | 2/2001 | Ikeda | |
| 6,252,974 B1 | 6/2001 | Martens | |
| 6,266,068 B1 | 7/2001 | Kang | |
| 6,281,903 B1 | 8/2001 | Martin | |
| 6,327,381 B1 | 12/2001 | Rogina | |
| 6,385,245 B1 | 5/2002 | De Haan | |
| 6,504,569 B1 | 1/2003 | Jasinschi | |
| 6,522,787 B1 | 2/2003 | Kumar | |
| 6,778,207 B1 | 8/2004 | Lee | |
| 6,814,889 B1 | 11/2004 | O'Grady | |
| 6,975,756 B1 | 12/2005 | Slabaugh | |
| 7,167,180 B1 | 1/2007 | Shibolet | |
| 7,593,000 B1 | 9/2009 | Chin | |
| 7,631,261 B2 | 12/2009 | Williams | |
| 7,631,277 B1 * | 12/2009 | Nie | G06T 19/20 |
| | | | 715/848 |
| 8,078,004 B2 | 12/2011 | Kang | |
| 8,094,928 B2 * | 1/2012 | Graepel | G06K 9/00355 |
| | | | 345/419 |
| 8,160,391 B1 | 4/2012 | Zhu | |
| 8,244,069 B1 | 8/2012 | Bourdev | |
| 8,401,276 B1 | 3/2013 | Choe | |
| 8,503,826 B2 | 8/2013 | Klimenko | |
| 8,504,842 B2 | 8/2013 | Meacham | |
| 8,515,982 B1 | 8/2013 | Hickman | |
| 8,589,069 B1 | 11/2013 | Lehman | |
| 8,682,097 B2 | 3/2014 | Steinberg | |
| 8,803,912 B1 | 8/2014 | Fouts | |
| 8,817,071 B2 | 8/2014 | Wang | |
| 8,819,525 B1 | 8/2014 | Holmer | |
| 8,866,841 B1 | 10/2014 | Distler | |
| 8,942,917 B2 | 1/2015 | Chrysanthakopoulos | |
| 8,947,452 B1 | 2/2015 | Ballagh | |
| 8,947,455 B2 | 2/2015 | Friesen | |
| 8,963,855 B2 | 2/2015 | Chen | |
| 8,966,356 B1 | 2/2015 | Hickman | |
| 9,024,970 B2 | 5/2015 | Lynch | |
| 9,027,117 B2 | 5/2015 | Wilairat | |
| 9,043,222 B1 | 5/2015 | Kerr | |
| 9,070,402 B2 | 6/2015 | Burtnyk | |
| 9,094,670 B1 | 7/2015 | Furio | |
| 9,129,179 B1 | 9/2015 | Wong | |
| 9,317,881 B1 | 4/2016 | Ledterman | |
| 9,325,899 B1 | 4/2016 | Chou | |
| 9,367,951 B1 | 6/2016 | Gray | |
| 9,390,250 B2 | 7/2016 | Kim | |
| 9,400,595 B2 | 7/2016 | Li | |
| 9,407,816 B1 | 8/2016 | Sehn | |
| 9,412,203 B1 | 8/2016 | Garcia, III | |
| 9,472,161 B1 | 10/2016 | Ho | |
| 9,621,768 B1 * | 4/2017 | Lyon | H04N 5/00 |
| 9,704,257 B1 | 7/2017 | Tuzel | |
| 9,734,586 B2 | 8/2017 | Luo | |
| 9,865,033 B1 | 1/2018 | Jafarzadeh | |
| 9,865,058 B2 | 1/2018 | Mullins | |
| 9,865,069 B1 | 1/2018 | Saporta | |
| 9,886,771 B1 | 2/2018 | Chen | |
| 9,898,742 B2 | 2/2018 | Higgins | |
| 9,904,056 B2 | 2/2018 | Raghoebardajal | |
| 9,910,505 B2 | 3/2018 | Park | |
| 9,928,544 B1 | 3/2018 | Hasan | |
| 9,940,541 B2 | 4/2018 | Holzer | |
| 9,968,257 B1 | 5/2018 | Burt | |
| 9,998,663 B1 | 6/2018 | François | |
| 10,055,882 B2 | 8/2018 | Marin | |
| 10,147,211 B2 | 12/2018 | Holzer et al. | |
| 10,157,333 B1 | 12/2018 | Wang | |
| 10,176,592 B2 | 1/2019 | Holzer et al. | |
| 10,176,636 B1 | 1/2019 | Neustein | |
| 10,204,448 B2 | 2/2019 | Hazeghi | |
| 10,222,932 B2 | 3/2019 | Holzer | |
| 10,242,474 B2 | 3/2019 | Holzer | |
| 10,262,426 B2 | 4/2019 | Holzer | |
| 10,275,935 B2 | 4/2019 | Holzer | |
| 10,284,794 B1 | 5/2019 | Francois | |
| 10,306,203 B1 | 5/2019 | Goyal | |
| 10,360,601 B1 | 7/2019 | Adegan | |
| 10,373,260 B1 | 8/2019 | Haller, Jr. | |
| 10,382,739 B1 | 8/2019 | Rusu | |
| 10,430,995 B2 | 10/2019 | Holzer | |
| 10,574,974 B2 | 2/2020 | Arora | |
| 10,592,199 B2 * | 3/2020 | Rakshit | G11B 27/102 |
| 10,657,647 B1 | 5/2020 | Chen | |
| 10,668,965 B2 | 6/2020 | Czinger | |
| 10,719,939 B2 | 7/2020 | Holzer | |
| 10,725,609 B2 | 7/2020 | Holzer | |
| 10,726,560 B2 | 7/2020 | Holzer | |
| 10,748,313 B2 | 8/2020 | Holzer | |
| 10,750,161 B2 | 8/2020 | Holzer | |
| 10,818,029 B2 | 10/2020 | Holzer | |
| 10,846,913 B2 | 11/2020 | Holzer | |
| 10,852,902 B2 | 12/2020 | Holzer | |
| 11,006,095 B2 | 5/2021 | Holzer | |
| 11,055,534 B2 | 7/2021 | Beall | |
| 11,138,432 B2 | 10/2021 | Holzer | |
| 2001/0014172 A1 | 8/2001 | Baba | |
| 2001/0046262 A1 | 11/2001 | Freda | |
| 2002/0024517 A1 | 2/2002 | Yamaguchi | |
| 2002/0094125 A1 | 7/2002 | Guo | |
| 2002/0190991 A1 | 12/2002 | Efran | |
| 2003/0065668 A1 * | 4/2003 | Sowizral | G06T 15/20 |
| 2003/0086002 A1 | 5/2003 | Cahill | |
| 2003/0137506 A1 | 7/2003 | Efran | |
| 2003/0137517 A1 | 7/2003 | Kondo | |
| 2003/0185456 A1 | 10/2003 | Sato | |
| 2003/0231179 A1 | 12/2003 | Suzuki | |
| 2004/0085335 A1 | 5/2004 | Burlnyk | |
| 2004/0104935 A1 | 6/2004 | Williamson | |
| 2004/0141014 A1 | 7/2004 | Kamiwada | |
| 2004/0184013 A1 | 9/2004 | Raskar | |
| 2004/0222987 A1 | 11/2004 | Chang | |
| 2004/0239699 A1 * | 12/2004 | Uyttendaele | G06F 16/748 |
| | | | 715/716 |
| 2005/0018045 A1 | 1/2005 | Thomas | |
| 2005/0041842 A1 | 2/2005 | Frakes | |
| 2005/0046645 A1 | 3/2005 | Breton | |
| 2005/0119550 A1 | 6/2005 | Serra | |
| 2005/0151759 A1 | 7/2005 | Gonzalez-Banos | |
| 2005/0186548 A1 * | 8/2005 | Tomlinson | G09B 5/06 |
| | | | 434/309 |
| 2005/0219264 A1 | 10/2005 | Shum | |

(56) References Cited

U.S. PATENT DOCUMENTS

| | | |
|---|---|---|
| 2005/0226502 A1 | 10/2005 | Cohen |
| 2005/0232467 A1 | 10/2005 | Mohri |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick, III |
| 2006/0028552 A1 | 2/2006 | Aggarwal |
| 2006/0087498 A1 | 4/2006 | Evemy |
| 2006/0188147 A1 | 8/2006 | Rai |
| 2006/0193535 A1 | 8/2006 | Mishima |
| 2006/0250505 A1 | 11/2006 | Gennetten |
| 2006/0256109 A1 | 11/2006 | Acker |
| 2007/0008312 A1 | 1/2007 | Zhou |
| 2007/0058880 A1 | 3/2007 | Lienard |
| 2007/0064802 A1 | 3/2007 | Paniconi |
| 2007/0070069 A1 | 3/2007 | Samarasekera |
| 2007/0110338 A1 | 5/2007 | Snavely |
| 2007/0118801 A1* | 5/2007 | Harshbarger ........ G11B 27/031 715/730 |
| 2007/0126928 A1 | 6/2007 | Klompnhouwer |
| 2007/0159487 A1 | 7/2007 | Felt |
| 2007/0237420 A1 | 10/2007 | Steedly |
| 2007/0237422 A1 | 10/2007 | Zhou |
| 2007/0252804 A1 | 11/2007 | Engel |
| 2007/0269054 A1* | 11/2007 | Takagi .................... A63F 13/54 381/71.4 |
| 2008/0009734 A1 | 1/2008 | Houle |
| 2008/0025588 A1 | 1/2008 | Zhang |
| 2008/0033641 A1 | 2/2008 | Medalia |
| 2008/0106593 A1 | 5/2008 | Arfvidsson |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Lyon |
| 2008/0225132 A1 | 9/2008 | Inaguma |
| 2008/0232716 A1 | 9/2008 | Plagne |
| 2008/0246759 A1 | 10/2008 | Summers |
| 2008/0266142 A1 | 10/2008 | Sula |
| 2008/0278569 A1 | 11/2008 | Rotem |
| 2008/0313014 A1 | 12/2008 | Fell |
| 2009/0003725 A1* | 1/2009 | Merkel .................... G06T 7/254 382/274 |
| 2009/0046160 A1 | 2/2009 | Hayashi |
| 2009/0077161 A1 | 4/2009 | Roberts et al. |
| 2009/0087029 A1 | 4/2009 | Coleman |
| 2009/0116732 A1 | 5/2009 | Zhou |
| 2009/0141130 A1 | 6/2009 | Ortiz |
| 2009/0144173 A1 | 6/2009 | Mo |
| 2009/0153549 A1 | 6/2009 | Lynch |
| 2009/0160934 A1 | 6/2009 | Hendrickson |
| 2009/0163185 A1* | 6/2009 | Lim .................... H04N 5/23206 455/414.1 |
| 2009/0174709 A1 | 7/2009 | Kozlak |
| 2009/0208062 A1 | 8/2009 | Sorek |
| 2009/0259946 A1* | 10/2009 | Dawson ................ G06Q 30/02 715/753 |
| 2009/0262074 A1 | 10/2009 | Nasiri |
| 2009/0263045 A1 | 10/2009 | Szeliski |
| 2009/0274391 A1 | 11/2009 | Arcas |
| 2009/0276805 A1 | 11/2009 | Andrews, II |
| 2009/0282335 A1* | 11/2009 | Alexandersson ....... G06F 3/167 715/716 |
| 2009/0303343 A1 | 12/2009 | Drimbarean |
| 2010/0007715 A1 | 1/2010 | Lai |
| 2010/0017181 A1 | 1/2010 | Mouton |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Engin |
| 2010/0098258 A1* | 4/2010 | Thorn .................... G06K 9/0057 381/1 |
| 2010/0100492 A1 | 4/2010 | Law |
| 2010/0110069 A1 | 5/2010 | Yuan |
| 2010/0111444 A1 | 5/2010 | Coffman |
| 2010/0164990 A1 | 7/2010 | Van Doorn |
| 2010/0171691 A1 | 7/2010 | Cook |
| 2010/0188584 A1 | 7/2010 | Liu |
| 2010/0215251 A1 | 8/2010 | Klein Gunnewiek et al. |
| 2010/0225743 A1 | 9/2010 | Florencio et al. |
| 2010/0231593 A1 | 9/2010 | Zhou |
| 2010/0259595 A1 | 10/2010 | Trimeche |
| 2010/0265164 A1* | 10/2010 | Okuno .................... H04S 7/304 345/8 |
| 2010/0266172 A1 | 10/2010 | Shlomi |
| 2010/0305857 A1 | 12/2010 | Byrne |
| 2010/0315412 A1 | 12/2010 | Sinha |
| 2010/0329542 A1 | 12/2010 | Ramalingam |
| 2011/0007072 A1 | 1/2011 | Khan |
| 2011/0033170 A1* | 2/2011 | Ikeda .................... G11B 27/034 386/244 |
| 2011/0034103 A1* | 2/2011 | Fong ........................ A63H 3/28 446/297 |
| 2011/0040539 A1 | 2/2011 | Szymczyk |
| 2011/0043604 A1 | 2/2011 | Peleg |
| 2011/0064388 A1* | 3/2011 | Brown .................... G06T 13/20 386/285 |
| 2011/0074926 A1 | 3/2011 | Khan |
| 2011/0090344 A1* | 4/2011 | Gefen ...................... G06T 7/248 348/169 |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141141 A1 | 6/2011 | Kankainen |
| 2011/0141227 A1 | 6/2011 | Bigioi |
| 2011/0142289 A1 | 6/2011 | Barenbrug |
| 2011/0142343 A1 | 6/2011 | Kim |
| 2011/0170789 A1 | 7/2011 | Amon |
| 2011/0173565 A1 | 7/2011 | Ofek |
| 2011/0179373 A1 | 7/2011 | Moore |
| 2011/0193941 A1 | 8/2011 | Inaba |
| 2011/0214072 A1 | 9/2011 | Lindemann |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic |
| 2011/0288858 A1 | 11/2011 | Gay et al. |
| 2011/0313653 A1 | 12/2011 | Lindner |
| 2011/0316963 A1 | 12/2011 | Li |
| 2012/0007713 A1 | 1/2012 | Nasiri |
| 2012/0013711 A1 | 1/2012 | Tamir |
| 2012/0017147 A1 | 1/2012 | Mark |
| 2012/0019557 A1 | 1/2012 | Aronsson |
| 2012/0028706 A1 | 2/2012 | Raitt |
| 2012/0041722 A1 | 2/2012 | Quan |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1* | 4/2012 | McCutchen ............... G06T 3/00 345/474 |
| 2012/0095323 A1 | 4/2012 | Eskandari |
| 2012/0099804 A1 | 4/2012 | Aguilera |
| 2012/0127172 A1 | 5/2012 | Wu |
| 2012/0127270 A1 | 5/2012 | Zhang |
| 2012/0139918 A1 | 6/2012 | Michail |
| 2012/0147224 A1 | 6/2012 | Takayama |
| 2012/0148162 A1 | 6/2012 | Zhang |
| 2012/0162223 A1 | 6/2012 | Hirai |
| 2012/0162253 A1 | 6/2012 | Collins |
| 2012/0167146 A1 | 6/2012 | Incorvia |
| 2012/0198317 A1 | 8/2012 | Eppolito et al. |
| 2012/0207308 A1* | 8/2012 | Sung ...................... H04S 7/304 381/17 |
| 2012/0212579 A1 | 8/2012 | Froejdh |
| 2012/0236201 A1* | 9/2012 | Larsen .................... G06Q 10/10 348/468 |
| 2012/0240035 A1 | 9/2012 | Gaucas |
| 2012/0242798 A1 | 9/2012 | McArdle |
| 2012/0257025 A1 | 10/2012 | Kim |
| 2012/0257065 A1 | 10/2012 | Velarde |
| 2012/0258436 A1* | 10/2012 | Lee ........................ G09B 1/10 434/362 |

(56) References Cited

U.S. PATENT DOCUMENTS

| | | |
|---|---|---|
| 2012/0262580 A1 | 10/2012 | Huebner |
| 2012/0287123 A1 | 11/2012 | Starner |
| 2012/0293632 A1 | 11/2012 | Yukich |
| 2012/0294549 A1 | 11/2012 | Doepke |
| 2012/0300019 A1 | 11/2012 | Yang |
| 2012/0301044 A1 | 11/2012 | Nakada |
| 2012/0314027 A1 | 12/2012 | Tian |
| 2012/0314040 A1 | 12/2012 | Kopf |
| 2012/0314899 A1 | 12/2012 | Cohen |
| 2012/0330659 A1* | 12/2012 | Nakadai .................. G10L 21/06 704/E15.044 |
| 2013/0002649 A1 | 1/2013 | Wu |
| 2013/0016102 A1 | 1/2013 | Look |
| 2013/0016897 A1 | 1/2013 | Cho |
| 2013/0018881 A1 | 1/2013 | Bhatt |
| 2013/0044191 A1 | 2/2013 | Matsumoto |
| 2013/0050573 A1* | 2/2013 | Syed .................. H04N 13/0059 348/441 |
| 2013/0057644 A1 | 3/2013 | Stefanoski |
| 2013/0063549 A1 | 3/2013 | Schnyder |
| 2013/0071012 A1 | 3/2013 | Leichsenring |
| 2013/0076619 A1 | 3/2013 | Carr |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1* | 5/2013 | Feinson .................. H04N 5/77 386/223 |
| 2013/0141530 A1 | 6/2013 | Zavesky |
| 2013/0147795 A1 | 6/2013 | Kim |
| 2013/0147905 A1 | 6/2013 | Vivekanandan |
| 2013/0154926 A1 | 6/2013 | Kim |
| 2013/0155180 A1 | 6/2013 | Wantland |
| 2013/0162634 A1 | 6/2013 | Baik |
| 2013/0162787 A1 | 6/2013 | Cho |
| 2013/0176392 A1 | 7/2013 | Carr |
| 2013/0195350 A1 | 8/2013 | Tanaka |
| 2013/0204411 A1 | 8/2013 | Clark |
| 2013/0208900 A1* | 8/2013 | Vincent .................. H04S 7/303 381/17 |
| 2013/0212538 A1 | 8/2013 | Lemire |
| 2013/0219357 A1 | 8/2013 | Reitan |
| 2013/0240628 A1 | 9/2013 | Van Der Merwe |
| 2013/0250045 A1 | 9/2013 | Ki |
| 2013/0271566 A1 | 10/2013 | Chen |
| 2013/0278596 A1 | 10/2013 | Wu |
| 2013/0314442 A1 | 11/2013 | Langlotz |
| 2014/0002440 A1 | 1/2014 | Lynch |
| 2014/0002472 A1 | 1/2014 | Sobeski |
| 2014/0009462 A1 | 1/2014 | McNamer |
| 2014/0013414 A1 | 1/2014 | Bruck |
| 2014/0023341 A1 | 1/2014 | Wang |
| 2014/0037198 A1 | 2/2014 | Larlus-Larrondo |
| 2014/0040742 A1* | 2/2014 | Park .................. G06F 3/0484 715/719 |
| 2014/0049607 A1 | 2/2014 | Amon |
| 2014/0059674 A1 | 2/2014 | Sun |
| 2014/0063005 A1 | 3/2014 | Ahn |
| 2014/0078136 A1 | 3/2014 | Sohn |
| 2014/0086551 A1* | 3/2014 | Kaneko .................. H04N 9/87 386/230 |
| 2014/0087877 A1 | 3/2014 | Krishnan |
| 2014/0092259 A1* | 4/2014 | Tsang .................. G06F 1/1632 348/207.1 |
| 2014/0100995 A1 | 4/2014 | Koshy |
| 2014/0107888 A1 | 4/2014 | Quast |
| 2014/0118479 A1 | 5/2014 | Rapoport |
| 2014/0118483 A1 | 5/2014 | Rapoport |
| 2014/0118494 A1 | 5/2014 | Wu |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra |
| 2014/0177927 A1 | 6/2014 | Shieh |
| 2014/0192155 A1 | 7/2014 | Choi |
| 2014/0198184 A1 | 7/2014 | Stein |
| 2014/0199050 A1 | 7/2014 | Khalsa |
| 2014/0211989 A1 | 7/2014 | Ding |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen |
| 2014/0297798 A1* | 10/2014 | Bakalash .................. G06T 1/20 709/217 |
| 2014/0307045 A1 | 10/2014 | Richardt |
| 2014/0340404 A1 | 11/2014 | Wang |
| 2014/0362198 A1 | 12/2014 | Nakayama |
| 2014/0365888 A1* | 12/2014 | Curzon .................. G06F 16/40 715/716 |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0022518 A1 | 1/2015 | Takeshita |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1* | 4/2015 | Ure .................. G08B 5/223 348/159 |
| 2015/0103170 A1 | 4/2015 | Nelson |
| 2015/0103197 A1 | 4/2015 | Djordjevic |
| 2015/0130799 A1 | 5/2015 | Holzer |
| 2015/0130800 A1 | 5/2015 | Holzer |
| 2015/0130894 A1 | 5/2015 | Holzer |
| 2015/0134651 A1 | 5/2015 | Holzer |
| 2015/0138190 A1 | 5/2015 | Holzer |
| 2015/0143239 A1 | 5/2015 | Birkbeck et al. |
| 2015/0154442 A1 | 6/2015 | Takahashi |
| 2015/0188967 A1* | 7/2015 | Paulauskas ............. H04L 67/10 709/219 |
| 2015/0193863 A1 | 7/2015 | Cao |
| 2015/0193963 A1 | 7/2015 | Chen |
| 2015/0198443 A1 | 7/2015 | Saehoon |
| 2015/0201176 A1 | 7/2015 | Graziosi |
| 2015/0206341 A1 | 7/2015 | Loper |
| 2015/0222880 A1 | 8/2015 | Choi |
| 2015/0227285 A1 | 8/2015 | Lee |
| 2015/0227816 A1 | 8/2015 | Du |
| 2015/0235408 A1 | 8/2015 | Gross |
| 2015/0242686 A1 | 8/2015 | Lenka |
| 2015/0254224 A1 | 9/2015 | Kim |
| 2015/0269772 A1 | 9/2015 | Ha |
| 2015/0271356 A1* | 9/2015 | Terada .................. H04N 19/50 348/231.99 |
| 2015/0281323 A1 | 10/2015 | Gold |
| 2015/0294492 A1 | 10/2015 | Koch |
| 2015/0309695 A1 | 10/2015 | Sannandeji |
| 2015/0318020 A1 | 11/2015 | Pribula |
| 2015/0319424 A1* | 11/2015 | Haimovitch-Yogev ..... H04N 5/247 348/48 |
| 2015/0324649 A1* | 11/2015 | Grewe .................. G06T 7/20 382/104 |
| 2015/0325044 A1 | 11/2015 | Lebovitz |
| 2015/0339846 A1 | 11/2015 | Holzer et al. |
| 2015/0371440 A1 | 12/2015 | Pirchheim |
| 2015/0379763 A1 | 12/2015 | Liktor |
| 2016/0001137 A1 | 1/2016 | Phillips |
| 2016/0012646 A1 | 1/2016 | Huang |
| 2016/0026253 A1* | 1/2016 | Bradski .................. G02B 27/225 345/8 |
| 2016/0027209 A1 | 1/2016 | Demirli |
| 2016/0034459 A1 | 2/2016 | Larsen |
| 2016/0042251 A1 | 2/2016 | Cordova-Diba |
| 2016/0044240 A1 | 2/2016 | Beers |
| 2016/0050368 A1 | 2/2016 | Seo |

(56) References Cited

U.S. PATENT DOCUMENTS

| | | | |
|---|---|---|---|
| 2016/0055330 A1 | 2/2016 | Morishita | |
| 2016/0061582 A1 | 3/2016 | Lucey | |
| 2016/0063740 A1 | 3/2016 | Sakimoto | |
| 2016/0066119 A1* | 3/2016 | Wu | H04S 7/30 381/303 |
| 2016/0077422 A1 | 3/2016 | Wang | |
| 2016/0078287 A1 | 3/2016 | Auge | |
| 2016/0080684 A1* | 3/2016 | Farrell | H04N 5/77 386/227 |
| 2016/0080830 A1 | 3/2016 | Kim | |
| 2016/0086381 A1 | 3/2016 | Jung | |
| 2016/0088287 A1 | 3/2016 | Sadi | |
| 2016/0110913 A1 | 4/2016 | Kosoy | |
| 2016/0139794 A1* | 5/2016 | Hammendorp | G06F 3/04883 715/716 |
| 2016/0140125 A1 | 5/2016 | Goyal | |
| 2016/0148349 A1 | 5/2016 | Cho | |
| 2016/0171330 A1 | 6/2016 | Mentese | |
| 2016/0189334 A1* | 6/2016 | Mason | G06T 19/006 345/419 |
| 2016/0191895 A1 | 6/2016 | Yun | |
| 2016/0203586 A1 | 7/2016 | Chang | |
| 2016/0205341 A1 | 7/2016 | Hollander | |
| 2016/0210602 A1 | 7/2016 | Siddique | |
| 2016/0261855 A1 | 9/2016 | Park | |
| 2016/0267676 A1 | 9/2016 | Setomoto | |
| 2016/0275283 A1 | 9/2016 | De Leon | |
| 2016/0295127 A1 | 10/2016 | Yu | |
| 2016/0350930 A1 | 12/2016 | Lin | |
| 2016/0350975 A1 | 12/2016 | Nakagawa | |
| 2016/0353089 A1 | 12/2016 | Gallup | |
| 2016/0358337 A1 | 12/2016 | Dai | |
| 2016/0379415 A1 | 12/2016 | Espeset | |
| 2017/0018054 A1 | 1/2017 | Holzer | |
| 2017/0018055 A1 | 1/2017 | Holzer | |
| 2017/0018056 A1 | 1/2017 | Holzer | |
| 2017/0024094 A1 | 1/2017 | Gresham | |
| 2017/0026574 A1 | 1/2017 | Kwon | |
| 2017/0053169 A1* | 2/2017 | Cuban | B64D 47/08 |
| 2017/0067739 A1 | 3/2017 | Siercks | |
| 2017/0084001 A1 | 3/2017 | Holzer | |
| 2017/0084293 A1 | 3/2017 | Holzer | |
| 2017/0087415 A1 | 3/2017 | Nandimandalam | |
| 2017/0103510 A1 | 4/2017 | Wang | |
| 2017/0103584 A1 | 4/2017 | Vats | |
| 2017/0109930 A1 | 4/2017 | Holzer | |
| 2017/0124769 A1 | 5/2017 | Saito | |
| 2017/0124770 A1 | 5/2017 | Vats | |
| 2017/0126988 A1 | 5/2017 | Holzer | |
| 2017/0140236 A1 | 5/2017 | Price | |
| 2017/0148179 A1 | 5/2017 | Holzer | |
| 2017/0148186 A1 | 5/2017 | Holzer | |
| 2017/0148199 A1 | 5/2017 | Holzer | |
| 2017/0148222 A1 | 5/2017 | Holzer | |
| 2017/0148223 A1 | 5/2017 | Holzer | |
| 2017/0158131 A1 | 6/2017 | Friebe | |
| 2017/0206648 A1 | 7/2017 | Marra | |
| 2017/0213385 A1 | 7/2017 | Yu | |
| 2017/0231550 A1 | 8/2017 | Do | |
| 2017/0236287 A1 | 8/2017 | Shen | |
| 2017/0249339 A1 | 8/2017 | Lester | |
| 2017/0255648 A1 | 9/2017 | Dube | |
| 2017/0256066 A1 | 9/2017 | Richard | |
| 2017/0277363 A1 | 9/2017 | Holzer | |
| 2017/0277952 A1 | 9/2017 | Thommes | |
| 2017/0278544 A1 | 9/2017 | Choi | |
| 2017/0287137 A1 | 10/2017 | Lin | |
| 2017/0293894 A1 | 10/2017 | Taliwal | |
| 2017/0308771 A1 | 10/2017 | Shimauchi | |
| 2017/0316092 A1 | 11/2017 | Fichter | |
| 2017/0330319 A1 | 11/2017 | Xu | |
| 2017/0337693 A1 | 11/2017 | Baruch | |
| 2017/0344223 A1 | 11/2017 | Holzer | |
| 2017/0344808 A1 | 11/2017 | El-Khamy | |
| 2017/0357910 A1 | 12/2017 | Sommer | |
| 2017/0359570 A1 | 12/2017 | Holzer | |
| 2017/0364766 A1 | 12/2017 | Das | |
| 2018/0012330 A1 | 1/2018 | Holzer | |
| 2018/0012529 A1 | 1/2018 | Chiba | |
| 2018/0035105 A1 | 2/2018 | Choi | |
| 2018/0035500 A1 | 2/2018 | Song | |
| 2018/0045592 A1 | 2/2018 | Okita | |
| 2018/0046356 A1 | 2/2018 | Holzer | |
| 2018/0046357 A1 | 2/2018 | Holzer | |
| 2018/0046649 A1 | 2/2018 | Dal Mutto | |
| 2018/0052665 A1 | 2/2018 | Kaur | |
| 2018/0063504 A1 | 3/2018 | Haines | |
| 2018/0082715 A1 | 3/2018 | Rymkowski | |
| 2018/0143023 A1 | 5/2018 | Bjorke | |
| 2018/0143756 A1 | 5/2018 | Mildrew | |
| 2018/0144547 A1 | 5/2018 | Shakib | |
| 2018/0155057 A1 | 6/2018 | Irish | |
| 2018/0158197 A1 | 6/2018 | Dasgupta | |
| 2018/0165875 A1 | 6/2018 | Yu | |
| 2018/0199025 A1 | 7/2018 | Holzer | |
| 2018/0203877 A1 | 7/2018 | Holzer | |
| 2018/0205941 A1 | 7/2018 | Kopf | |
| 2018/0211131 A1 | 7/2018 | Holzer | |
| 2018/0211404 A1 | 7/2018 | Zhu | |
| 2018/0218235 A1 | 8/2018 | Holzer | |
| 2018/0218236 A1 | 8/2018 | Holzer | |
| 2018/0234671 A1 | 8/2018 | Yang | |
| 2018/0240243 A1 | 8/2018 | Kim | |
| 2018/0255290 A1 | 9/2018 | Holzer | |
| 2018/0268220 A1 | 9/2018 | Lee | |
| 2018/0286098 A1 | 10/2018 | Lorenzo | |
| 2018/0293774 A1 | 10/2018 | Yu | |
| 2018/0315200 A1 | 11/2018 | Davydov | |
| 2018/0336724 A1 | 11/2018 | Spring | |
| 2018/0336737 A1 | 11/2018 | Varady | |
| 2018/0338126 A1 | 11/2018 | Trevor | |
| 2018/0338128 A1 | 11/2018 | Trevor | |
| 2018/0357518 A1 | 12/2018 | Sekii | |
| 2018/0374273 A1 | 12/2018 | Holzer | |
| 2019/0019056 A1 | 1/2019 | Pierce | |
| 2019/0025544 A1 | 1/2019 | Watanabe | |
| 2019/0026956 A1 | 1/2019 | Gausebeck | |
| 2019/0035149 A1 | 1/2019 | Chen | |
| 2019/0050664 A1 | 2/2019 | Yang | |
| 2019/0080499 A1 | 3/2019 | Holzer | |
| 2019/0094981 A1 | 3/2019 | Bradski | |
| 2019/0132569 A1 | 5/2019 | Karpenko | |
| 2019/0147221 A1 | 5/2019 | Grabner | |
| 2019/0209886 A1 | 7/2019 | Harlow | |
| 2019/0213392 A1 | 7/2019 | Pan | |
| 2019/0213406 A1 | 7/2019 | Porikli | |
| 2019/0220991 A1 | 7/2019 | Holzer | |
| 2019/0221021 A1 | 7/2019 | Holzer | |
| 2019/0222776 A1 | 7/2019 | Carter | |
| 2019/0235729 A1 | 8/2019 | Day | |
| 2019/0244372 A1 | 8/2019 | Holzer | |
| 2019/0251738 A1 | 8/2019 | Holzer | |
| 2019/0278434 A1 | 9/2019 | Holzer | |
| 2019/0304064 A1 | 10/2019 | Zhang | |
| 2019/0364265 A1 | 11/2019 | Matsunobu | |
| 2020/0027263 A1 | 1/2020 | Holzer | |
| 2020/0045249 A1 | 2/2020 | Francois | |
| 2020/0125877 A1 | 4/2020 | Phan | |
| 2020/0128060 A1 | 4/2020 | Han | |
| 2020/0137380 A1 | 4/2020 | Supikov | |
| 2020/0167570 A1 | 5/2020 | Beall | |
| 2020/0234397 A1 | 7/2020 | Holzer | |
| 2020/0234451 A1 | 7/2020 | Holzer | |

FOREIGN PATENT DOCUMENTS

| | | |
|---|---|---|
| CN | 105849781 B | 8/2016 |
| DE | 112014005165 T5 | 7/2016 |
| DE | 112017004150 | 6/2019 |
| KR | 20120110861 | 10/2012 |
| KR | 101590256 B1 | 2/2016 |
| WO | 2015073570 A2 | 5/2015 |
| WO | 2017053197 A1 | 3/2017 |
| WO | 2018035500 A1 | 2/2018 |

(56) References Cited

FOREIGN PATENT DOCUMENTS

| | | |
|---|---|---|
| WO | 2018052665 A1 | 3/2018 |
| WO | 2018154331 A1 | 8/2018 |
| WO | 2019209886 | 10/2019 |
| WO | 2020092177 A2 | 5/2020 |

OTHER PUBLICATIONS

"Int'l Application Serial No. PCT/US16/52192, Int'l Preliminary Reporton Patentability dated Apr. 5, 2018", 7 pgs.

"U.S. Appl. No. 15/409,500, Examiner Interview Summary dated Mar. 5, 2019", 3 pages.

"U.S. Appl. No. 15/409,500, Non Final Office Action dated Dec. 11, 2018", 11 pgs.

"U.S. Appl. No. 15/409,500, Notice of Allowance dated Jun. 3, 2019", 8 pages.

"U.S. Appl. No. 15/601,863, Examiner Interview Summary dated Nov. 21, 2018", 4 pgs.

"U.S. Appl. No. 15/601,863, Non Final Office Action dated Sep. 20, 2018", 23 pages.

"U.S. Appl. No. 15/601,863, Notice of Allowance dated Jan. 24, 2019", 8 pages.

U.S. Appl. No. 14/860,983, Final Rejection, dated Feb. 12, 2020, 18 pgs.

U.S. Appl. No. 15/620,506, Notice Of Allowance And Fees Due (Ptol-85), dated Mar. 2, 2020, 10 pgs.

U.S. Appl. No. 15/673,125, Final Rejection, dated Feb. 19, 2020, 17 pgs.

U.S. Appl. No. 15/713,406, Final Rejection, dated Feb. 19, 2020, 22 pgs.

U.S. Appl. No. 15/969,749, Final Rejection, dated Feb. 26, 2020, 15 pgs.

U.S. Appl. No. 16/586,868, USPTO e-Office Action: CTNF—Non-Final Rejection, dated Dec. 20, 2019, 19 pgs.

U.S. Appl. No. 14/800,638, Non Final Office Action dated Jul. 29, 2016, 11 pgs.

U.S. Appl. No. 12/101,883, Examiner Interview Summary dated Oct. 18, 2017, 2 pgs.

U.S. Appl. No. 13/464,588, Non Final Office Action dated Aug. 2, 2019, 14 pgs.

U.S. Appl. No. 14/530,669, Advisory Action dated Aug. 8, 2017, 5 pgs.

U.S. Appl. No. 14/530,669, Examiner Interview Summary dated Apr. 14, 2017, 3 pgs.

U.S. Appl. No. 14/530,669, Examiner Interview Summary dated Aug. 8, 2017, 2 pgs.

U.S. Appl. No. 14/530,669, Final Office Action dated Apr. 20, 2017, 25 pgs.

U.S. Appl. No. 14/530,669, Non Final Office Action dated Jan. 3, 2017, 26 pgs.

U.S. Appl. No. 14/530,671, Non Final Office Action dated Jan. 3, 2017, 32 pgs.

U.S. Appl. No. 14/539,814, Non Final Office Action dated Dec. 30, 2016, 37 pgs.

U.S. Appl. No. 14/539,889, Non Final Office Action dated Oct. 6, 2016, 14 pgs.

U.S. Appl. No. 14/800,638, Advisory Action dated May 9, 2017, 5 pgs.

U.S. Appl. No. 14/800,638, Examiner Interview Summary dated May 9, 2017, 2 pgs.

U.S. Appl. No. 14/800,638, Examiner Interview Summary dated Nov. 7, 2016, 3 pgs.

U.S. Appl. No. 14/800,638, Examiner Interview Summary dated Dec. 13, 2017, 1 pg.

U.S. Appl. No. 14/800,638, Final Office Action dated Jan. 20, 2017, 12 pgs.

U.S. Appl. No. 14/800,638, Non Final Office Action dated Jun. 15, 2017, 12 pgs.

U.S. Appl. No. 14/800,638, Notice of Allowance dated Dec. 13, 2017, 9 pgs.

U.S. Appl. No. 14/800,640, Advisory Action dated Jan. 5, 2018, 3 pgs.

U.S. Appl. No. 14/800,640, Advisory Action dated Feb. 8, 2018, 2 pgs.

U.S. Appl. No. 14/800,640, Examiner Interview Summary dated Feb. 8, 2018, 1 pg.

U.S. Appl. No. 14/800,640, Examiner Interview Summary dated Oct. 23, 2018, 3 pgs.

U.S. Appl. No. 14/800,640, Final Office Action dated Oct. 16, 2017, 15 pgs.

U.S. Appl. No. 14/800,640, Non Final Office Action dated Jun. 8, 2017, 14 pgs.

U.S. Appl. No. 14/800,640, Non Final Office Action dated Jul. 17, 2018, 16 pgs.

U.S. Appl. No. 14/800,640, Notice of Allowance dated Nov. 21, 2018, 7 pgs.

U.S. Appl. No. 14/800,640, Restriction Requirement dated Mar. 3, 2017, 5 pgs.

U.S. Appl. No. 14/800,642, Advisory Action dated Jan. 5, 2018, 3 pgs.

U.S. Appl. No. 14/800,642, Advisory Action dated Feb. 8, 2018, 3 pgs.

U.S. Appl. No. 14/800,642, Examiner Interview Summary dated Feb. 8, 2018, 1 pg.

U.S. Appl. No. 14/800,642, Examiner Interview Summary dated Aug. 6, 2018, 1 pg.

U.S. Appl. No. 14/800,642, Final Office Action dated Oct. 17, 2017, 18 pgs.

U.S. Appl. No. 14/800,642, Non Final Office Action dated May 18, 2017, 17 pgs.

U.S. Appl. No. 14/800,642, Notice of Allowance dated Aug. 6, 2018, 12 pgs.

U.S. Appl. No. 14/819,473, Examiner Interview Summary dated Jul. 11, 2016, 3 pgs.

U.S. Appl. No. 14/819,473, Examiner Interview Summary dated Aug. 17, 2016, 3 pgs.

U.S. Appl. No. 14/819,473, Examiner Interview Summary dated Oct. 14, 2016, 3 pgs.

U.S. Appl. No. 14/819,473, Final Office Action dated Apr. 28, 2016, 45 pgs.

U.S. Appl. No. 14/819,473, Non Final Office Action dated Sep. 1, 2016, 36 pgs.

U.S. Appl. No. 14/819,473, Non Final Office Action dated Oct. 8, 2015, 44 pgs.

U.S. Appl. No. 14/860,983, Advisory Action dated Jan. 23, 2018, 3 pgs.

U.S. Appl. No. 14/860,983, Advisory Action dated Mar. 26, 2019, 2 pgs.

U.S. Appl. No. 14/860,983, Examiner Interview Summary dated Mar. 26, 2019, 2 pgs.

U.S. Appl. No. 14/860,983, Examiner Interview Summary dated Apr. 8, 2019, 3 pgs.

U.S. Appl. No. 14/860,983, Examiner Interview Summary dated Nov. 15, 2018, 3 pgs.

U.S. Appl. No. 14/860,983, Final Office Action dated Jan. 18, 2019, 19 pgs.

U.S. Appl. No. 14/860,983, Final Office Action dated Oct. 18, 2017, 21 pgs.

U.S. Appl. No. 14/860,983, Non Final Office Action dated Jun. 8, 2017, 26 pgs.

U.S. Appl. No. 14/860,983, Non Final Office Action dated Aug. 7, 2018, 22 pgs.

U.S. Appl. No. 15/408,211, Advisory Action dated Mar. 18, 2019, 4 pgs.

U.S. Appl. No. 15/408,211, Examiner Interview Summary dated Mar. 4, 2019, 3 pgs.

U.S. Appl. No. 15/408,211, Examiner Interview Summary dated Mar. 18, 2019, 2 pgs.

U.S. Appl. No. 15/408,211, Examiner Interview Summary dated Apr. 3, 2019, 3 pgs.

(56) References Cited

OTHER PUBLICATIONS

U.S. Appl. No. 15/408,211, Examiner Interview Summary dated Aug. 5, 2019, 3 pgs.
U.S. Appl. No. 15/408,211, Examiner Interview Summary dated Oct. 16, 2019, 2 pgs.
U.S. Appl. No. 15/408,211, Examiner Interview Summary dated Dec. 5, 2018, 3 pgs.
U.S. Appl. No. 15/408,211, Final Office Action dated Jan. 11, 2019, 23 pgs.
U.S. Appl. No. 15/408,211, Non Final Office Action dated Aug. 6, 2018, 22 pgs.
U.S. Appl. No. 15/408,211, Non Final Office Action dated May 2, 2019, 20 pgs.
U.S. Appl. No. 15/425,983, Advisory Action dated Oct. 12, 2018, 5 pgs.
U.S. Appl. No. 15/425,983, Examiner Interview Summary dated May 3, 2018, 3 pgs.
U.S. Appl. No. 15/425,983, Examiner Interview Summary dated Sep. 28, 2018, 3 pgs.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pgs.
U.S. Appl. No. 15/425,983, Non Final Office Action dated Jan. 11, 2018, 29 pgs.
U.S. Appl. No. 15/425,983, Notice of Allowance dated Dec. 12, 2018, 14 pgs.
U.S. Appl. No. 15/425,988, Examiner Interview Summary dated Nov. 30, 2018, 3 pgs.
U.S. Appl. No. 15/425,988, Non Final Office Action dated Aug. 10, 2018, 18 pgs.
U.S. Appl. No. 15/425,988, Notice of Allowance dated Dec. 28, 2018, 8 pgs.
U.S. Appl. No. 15/426,994, Advisory Action dated Dec. 13, 2018, 3 pgs.
U.S. Appl. No. 15/426,994, Examiner Interview Summary dated Jan. 15, 2019, 3 pgs.
U.S. Appl. No. 15/426,994, Final Office Action dated Oct. 10, 2018, 21 pgs.
U.S. Appl. No. 15/426,994, Non Final Office Action dated Apr. 19, 2018, 22 pgs.
U.S. Appl. No. 15/426,994, Non Final Office Action dated Aug. 6, 2019, 22 pgs.
U.S. Appl. No. 15/427,009, Notice of Allowance dated Sep. 6, 2018, 9 pgs.
U.S. Appl. No. 15/428,104, Advisory Action dated Dec. 13, 2018, 3 pgs.
U.S. Appl. No. 15/428,104, Examiner Interview Summary dated Jan. 15, 2019, 3 pgs.
U.S. Appl. No. 15/428,104, Examiner Interview Summary dated Dec. 7, 2018, 3 pgs.
U.S. Appl. No. 15/428,104, Final Office Action dated Oct. 10, 2018, 23 pgs.
U.S. Appl. No. 15/428,104, Non Final Office Action dated Apr. 19, 2018, 21 pgs.
U.S. Appl. No. 15/428,104, Non Final Office Action dated Aug. 6, 2019, 24 pgs.
U.S. Appl. No. 15/620,506, Advisory Action dated Aug. 26, 2019, 2 pgs.
U.S. Appl. No. 15/620,506, Examiner Inteview Summary dated Aug. 26, 2019, 1 pg.
U.S. Appl. No. 15/620,506, Final Office Action dated Jun. 10, 2019, 17 pgs.
U.S. Appl. No. 15/620,506, Non Final Office Action dated Jan. 23, 2019, 13 pgs.
U.S. Appl. No. 15/673,125, Examiner Interview Summary dated Aug. 1, 2019, 3 pgs.
U.S. Appl. No. 15/673,125, Final Office Action dated Jun. 3, 2019, 17 pgs.
U.S. Appl. No. 15/673,125, Non Final Office Action dated Feb. 6, 2019, 17 pgs.
U.S. Appl. No. 15/682,362, Notice of Allowance dated Oct. 22, 2018, 9 pgs.
U.S. Appl. No. 15/713,406, Examiner Interview Summary dated Aug. 2, 2019, 3 pgs.
U.S. Appl. No. 15/713,406, Final Office Action dated Jun. 3, 2019, 21 pgs.
U.S. Appl. No. 15/713,406, Non Final Office Action dated Jan. 30, 2019, 21 pgs.
U.S. Appl. No. 15/724,081, Examiner Interview Summary dated Mar. 4, 2019, 3 pgs.
U.S. Appl. No. 15/724,081, Examiner Interview Summary dated Jul. 30, 2019, 3 pgs.
U.S. Appl. No. 15/724,081, Examiner Interview Summary dated Aug. 20, 2019, 2 pgs.
U.S. Appl. No. 15/724,081, Final Office Action dated May 14, 2019, 14 pgs.
U.S. Appl. No. 15/724,081, Non Final Office Action dated Dec. 11, 2018, 12 pgs.
U.S. Appl. No. 15/724,081, Notice of Allowance dated Aug. 20, 2019, 12 pgs.
U.S. Appl. No. 15/724,087, Final Office Action dated Jul. 1, 2019, 16 pgs.
U.S. Appl. No. 15/724,087, Non Final Office Action dated Jan. 31, 2019, 15 pgs.
U.S. Appl. No. 16/384,578, Corrected Notice of Allowance dated Nov. 26, 2019, 2 pgs.
U.S. Appl. No. 16/384,578, Non Final Office Action dated May 9, 2019, 9 pgs.
Ballan, Luca et al., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010, 11 pages.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
Buehler, Chris et al., "Unstructured Lumigraph Rendering", ACM, ACM SIGGRAPH, 2001, pp. 425-432.
Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.
Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.
Chen, Shenchang E., "QuickTime VR—An Image-Based Approach to Virtual Environment Navigation", ACM, SIGGRAPH '95 Proceedings of the 22nd annual Conference on Computer graphics and interactive techniques, 1995, 29-38.
Cläre, Adam, "Reality is a Game; What is Skybox?", retrieved from the Internet <http://www.realityisagame.com/archives/1776/what-is-a-skybox/>, Mar. 28, 2013, 5 pgs.
Davis, Abe et al., "Unstructured Light Fields", Blackwell Publishing, Computer Graphics Forum, vol. 31, Issue 2, Pt. 1, May 2012, pp. 305-314.
Extract all frames from video files, Video Help Forum, Oct. 2010, 3 pages.
Fischler, Martin A.., et al., Random Sample Consensus: A Paradigm for Model Fitting with Applications to Image Analysis and Automated Cartography, ACM, Communications of the ACM, vol. 24, No. 6, Jun. 1981, 381-395 pgs.
Fitzgibbon, Andrew, "Automatic 3D Model Acquisition and Generation of New Images from Video Sequences", IEEE, 9th European Signal Processing Conference, Sep. 1998, 8 pgs.
Fusiello, Andrea et al., "View Synthesis from Uncalibrated Images Using Parallax", Proceedings of the 12th International Conference on Image Analysis and Processing, 2003, pp. 146-151.

(56) References Cited

OTHER PUBLICATIONS

Fusiello, Andrea, Specifying Virtual Cameras In Uncalibrated View Synthesis, IEEE Transactions on Circuits and Systems for Video Technology, vol. 17, No. 5, May 2007, 8 pages.
Golovinskly, Aleksey et al., "Shape-based Recognition of 3D Point Clouds in Urban Environment", IEEE, IEEE 12th International Conference on Computer Vision (ICCV), 2009, 2154-2161.
International Application Serial No. PCT/US2016/042355, Search Report and Written Opinion dated Oct. 19, 2016, 9 pgs.
Intl Application Serial No. PCT/US17/47684, Intl Preliminary Report on Patentability dated Feb. 28, 2019, 7 pgs.
Intl Application Serial No. PCT/US17/47684, Intl Search Report and Written Opinion dated Oct. 27, 2017, 8 pgs.
Intl Application Serial No. PCT/US17/47859, Intl Preliminary Report on Patentability dated Feb. 28, 2019, 7 pgs.
Intl Application Serial No. PCT/US17/47859, Intl Search Report and Written Opinion dated Nov. 2, 2017, 8 pgs.
Intl Application Serial No. PCT/US19/030395, Intl Search Report and Written Opinion dated Sep. 2, 2019, 9 pgs.
Intl Application Serial No. PCT/US2014/065282, Search Report & Written Opinion dated Feb. 23, 2015, 9 pgs.
Keller, Maik et al., "Real-Time 3D Reconstruction in Dynamic Scenes Using Point-Based Fusion", IEEE, 2013 International Conference on 3DTV, Jul. 1, 2013, 8 pages.
Kottamasu, V. L. P. , "User Interaction of One-Dimensional Panoramic Images for iPod Touch", Thesis, Linkoping University Electronic Press, LIU-IDA-LITH-EX-A-12/071-SE, Dec. 4, 2012, 70 pages.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Mian, Ajmals, et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Notice of Allowance dated Apr. 20, 2021 for U.S. Appl. No. 15/969,749 (pp. 1-5).
Notice of Allowance dated May 3, 2021 for U.S. Appl. No. 16/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Mar. 12, 2021 for U.S. Appl. No. 16/726,090 (pp. 1-14).
Office Action dated Mar. 23, 2021 for U.S. Appl. No. 16/362,547 (pp. 1-15).
Pollard, Stephen et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A. et al., "Simultaneous 3D Tracking and Reconstruction on a Mobile Phone", IEEE International Symposium on Mixed and Augmented Reality, 2013, pp. 89-98.
Qi Pan et al., "Rapid Scene Reconstruction on Mobile Phones from Panoramic Images", Oct. 2011, pp. 55-64 (Year: 2011).
Russell, Bryan C, et al. "LabelMe: a database and web-based tool forimage annotation." International Journal of Computer vision 77.1-3 (2008): 157-173. (Year: 2008).
Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=r ep1&type=pdf>, 6 pages.
Shade, Jonathan et al., "Layered Depth Images", Proceedings ofthe 25th Annual Conference on Computer Graphics and Interactive Techniques, ACM, SIGGRAPH, Jul. 24, 1998, pp. 231-242.
Shin, Hong-Chang et al., "Fast View Synthesis using GPU for 3D Display", IEEE Transactions on Consumer Electronics, vol. 54, No. 4, Dec. 2008, pp. 2068-2076.
Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.
Steder, Bastian et al., "Robust On-line Model-based Object Detection from Range Images", International Conference on Intelligent Robots and Systems, pp. 4739-4744, Oct. 15, 2009, 6 pages.
Supplemental Notice of Allowability dated May 5, 2021 for U.S. Appl. No. 15/969,749 (pp. 1-2).
Thyssen, Anthony , "ImageMagick v6 Examples—Color Basics and Channels", Website http://www.imagemagick.org/Usage/color basics/, Retrieved Dec. 23, 2016, Mar. 9, 2011, 37 pgs.
Torr, P.H.S et al., "Robust Parameterization and Computation of the Trifocal Tensor", Elsevier, Image and Vision Computing, vol. 15, Issue 8, Aug. 1997, pp. 591-605.
United Kingdom Application Serial No. 1609577.0, Office Action dated Jun. 15, 2016, 1 pg.
Utasi, Ákos, and Csaba Benedek. "A multi-view annotation tool for people detection evaluation." Proceedings of the 1st international Workshop on Visual interfaces forground truth collection in Computer vision applications. ACM, 2012. (Year: 2012) 7 pages.
Weigel, Christian, et al., Advanced 3D Video Object Synthesis Based on Trilinear Tensors, IEEE Tenth International Symposium on Consumer Electronics, 2006, 5 pages.
Xiao, Jiangjian et al., "Tri-view Morphing", Elsevier, Computer Vision and Image Understanding, vol. 96, Issue 3, Dec. 2004, pp. 345-366.
Zhang, Zhengyou, et al., A robust technique for matching two uncalibrated images through the recovery ofthe unknown epipolar geometry, Elsevier, Artificial Intelligence 78, 1995, 87-119 pgs.
International Application Serial No. PCT/US2019/058204, Search Report and Written Opinion dated Apr. 21, 2020, 10 pages.
Notice of Allowance dated Jun. 17, 2021 for U.S. Appl. No. 15/604,938 (pp. 1-12).
Office Action (Final Rejection) dated Jan. 19, 2022 for U.S. Appl. No. 16/726,090 (pp. 1-16).
Office Action (Final Rejection) dated Apr. 25, 2022 for U.S. Appl. No. 16/813,506 (pp. 1-17).
Office Action (Final Rejection) dated Aug. 20, 2021 for U.S. Appl. No. 16/362,547 (pp. 1-15).
Office Action (Non-Final Rejection) dated Mar. 24, 2022 for U.S. Appl. No. 16/362,547 (pp. 1-14).
Office Action (Non-Final Rejection) dated Apr. 14, 2022 for U.S. Appl. No. 17/338,217 (pp. 1-10).
Office Action (Non-Final Rejection) dated Sep. 22, 2021 for U.S. Appl. No. 16/726,090 (pp. 1-15).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated May 18, 2022 for U.S. Appl. No. 16/389,544 (pp. 1-8).
Office Action (Notice of Allowance and Fees Due (PTOL-85)) dated Jun. 2, 2022 for U.S. Appl. No. 16/726,090 (pp. 1-7).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).

(56) References Cited

OTHER PUBLICATIONS

Office Action dated Jun. 3, 2021 for U.S. Appl. No. 16/179,746 (pp. 1-26).
Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and ffigure 2.
U.S. Appl. No. 15/632,709, Non-Final Rejection, dated May 22, 2020, 10 pgs.
U.S. Appl. No. 15/717,889, Non-Final Rejection, dated Oct. 27, 2020, 40 pgs.
U.S. Appl. No. 15/911,993, Non-Final Rejection, dated Aug. 5, 2020, 6 pgs.
U.S. Appl. No. 15/969,749, Non-Final Rejection, dated Sep. 17, 2020, 15 pgs.
U.S. Appl. No. 16/179,746, Advisory Action (Ptol-303), dated Sep. 15, 2020, 2 pgs.
U.S. Appl. No. 16/179,746, Examiner Interview Summary Record (Ptol - 413), dated Nov. 5, 2020, 2 pgs.
U.S. Appl. No. 16/362,547, Advisory Action (Ptol-303), dated Nov. 18, 2020, 2 pgs.
U.S. Appl. No. 16/362,547, Examiner Interview Summary Record (Ptol - 413), dated Nov. 18, 2020, 1 pg.
U.S. Appl. No. 16/362,547, Final Rejection, dated Sep. 24, 2020, 14 pgs.
U.S. Appl. No. 16/362,547,Examiner Interview Summary Record (Ptol - 413), dated Nov. 5, 2020, 2 pgs.
U.S. Appl. No. 16/426,323, Notice Of Allowance And Fees Due (Ptol-85), dated Aug. 5, 2020, 11 pgs.
U.S. Appl. No. 16/451,371, NOA—Notice Of Allowance And Fees Due (Ptol-85), dated Sep. 17, 2020, 5 pgs.
U.S. Appl. No. 16/451,371, Non-Final Rejection, dated Jun. 11, 2020,—9 pgs.
U.S. Appl. No. 16/586,868, Notice Of Allowance And Fees Due (Ptol-85), dated Oct. 7, 2020, 2 pgs.
U.S. Appl. No. 16/586,868, Notice Of Allowance And Fees Due (Ptol-85), dated Jul. 31, 2020,13 pgs.
U.S. Appl. No. 16/726,090, Non-Final Rejection, dated Nov. 19, 2020, 12 pgs.
Application No. 16/778,981, Non-Final Rejection, dated Oct. 13, 2020,7 pgs.
U.S. Appl. No. 12/101,883, Examiner Interview Summary dated Sep. 6, 2016, 3 pgs.
U.S. Appl. No. 14/800,642, Non-Final Office Action dated May 18, 2017, 17 pages.
U.S. Appl. No. 15/425,983, Examiner Interview Summary dated May 17, 2018, 3 pgs.
U.S. Appl. No. 15/632,709, Examiner Interview Summary dated Apr. 30, 2018, 1 pg.
U.S. Appl. No. 15/632,709, Final Office Action dated Jul. 17, 2018, 12 pgs.
U.S. Appl. No. 15/632,709, Non Final Office Action dated Apr. 3, 2019, 13 pgs.
U.S. Appl. No. 15/632,709, Non Final Office Action dated Apr. 30, 2018, 14 pgs.
U.S. Appl. No. 15/632,709, Notice of Allowance dated May 3, 2021, 9 pgs.
U.S. Appl. No. 15/717,889, Advisory Action dated Jul. 6, 2021, 3 pgs.
U.S. Appl. No. 15/717,889, Examiner Interview Summary dated Jun. 4, 2021, 2 pgs.
U.S. Appl. No. 15/717,889, Examiner Interview Summary dated Jul. 6, 2021, 2 pgs.
U.S. Appl. No. 15/717,889, Final Office Action dated Mar. 4, 2021, 37 pgs.
U.S. Appl. No. 15/911,993, Notice of Allowance dated Jan. 12, 2021, 8 pgs.
U.S. Appl. No. 15/963,896, Non Final Office Action dated Apr. 18, 2019, 7 pgs.
U.S. Appl. No. 15/963,896, Notice of Allowance dated May 22, 2019, 8 pgs.
U.S. Appl. No. 15/969,749, Examiner Interview Summary dated Apr. 20, 2021, 1 pg.
U.S. Appl. No. 16/179,746, Examiner Interview Summary dated Jun. 3, 2021, 1 pg.
U.S. Appl. No. 16/179,746, Final Office Action dated Jun. 3, 2021, 25 pgs.
U.S. Appl. No. 16/179,746, Non-Final Office Action dated Feb. 11, 2021, 25 pgs.
U.S. Appl. No. 16/362,547, Examiner Interview Summary dated Jul. 12, 2021, 2 pgs.
U.S. Appl. No. 16/362,547, Non-Final Office Action dated Mar. 23, 2021, 14 pgs.
U.S. Appl. No. 16/726,090, Advisory Action dated Jun. 21, 2021, 3 pgs.
U.S. Appl. No. 16/726,090, Examiner Interview Summary dated Feb. 25, 2021, 3 pgs.
U.S. Appl. No. 16/726,090, Examiner Interview Summary dated Jun. 21, 2021, 1 pg.
Application Serial No. 16/778,981, Corrected Notice of Allowance dated Mar. 31, 2021, 11 pgs.
Application Serial No. 16/778,981, Examiner Interview Summary dated Mar. 31, 2021, 1 pg.
Application Serial No. 16/778,981, Notice of Allowance dated Mar. 9, 2021, 9 pgs.
Gatys et al., "A Neural Algorithm of Artistic Style", Cornell University, arXiv:1508.06576v2 pp. 1-16. (Year: 2015).
International Application Serial No. PCT/US19/28807 Preliminary Report on Patentability dated Nov. 5, 2020, 9 pgs.
International Application Serial No. PCT/US19/28807 Search Report and Written Opinion dated Oct. 8, 2019, 12 pgs.
International Application Serial No. PCT/US19/58204, Preliminary Report on Patentability dated May 14, 2021, 7 pgs.
English Translation of CN104462365A, 13 pages, received Dec. 15, 2022.
Office Action (Final Rejection) dated Jul. 22, 2022 for U.S. Appl. No. 15/427,030 (pp. 1-18).
Office Action (Final Rejection) dated Sep. 2, 2022 for U.S. Appl. No. 16/362,547 (pp. 1-15).
Office Action (Non-Final Rejection) dated Sep. 12, 2022 for U.S. Appl. No. 16/813,506 (pp. 1-15).
Office Action (Non-Final Rejection) dated Sep. 16, 2022 for U.S. Appl. No. 17/373,737 (pp. 1-8).
Office Action (Non-Final Rejection) dated Oct. 4, 2022 for U.S. Appl. No. 17/352,654 (pp. 1-19).
Office Action (Non-Final Rejection) dated Oct. 5, 2022 for U.S. Appl. No. 17/483,573 (pp. 1-20).
Office Action (Non-Final Rejection) dated Oct. 5, 2022 for U.S. Appl. No. 17/519,452 (pp. 1-17).
Office Action (Notice of Allowance and Fees Due (PTOL-85)) dated Jun. 29, 2022 for U.S. Appl. No. 17/338,217 (pp. 1-9).

\* cited by examiner

INTEGRATION OF AUDIO INTO A MULTI-VIEW INTERACTIVE DIGITAL MEDIA REPRESENTATION

TECHNICAL FIELD

The present disclosure relates to integrating audio into a multi-view interactive digital media representation.

DESCRIPTION OF RELATED ART

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Consequently, traditional digital media formats, such as 2D flat images, do not easily lend themselves to reproducing memories and events with high fidelity. In addition, 2D videos are usually limited to a set playback of visual data from a particular viewpoint and a corresponding fixed audio track.

As technology has progressed, various three-dimensional (3D) media formats have developed, such as multi-view interactive digital media representations. Examples of these multi-view interactive media representations include surround views, multiview images, and 3D data formats. In these multi-view interactive digital media representations, a user can control how to view the image data. For instance, the user can navigate around various objects and select a viewpoint from which to view the image data.

A problem in the presentation of multi-view interactive digital media representations is how to include audio information in the viewing process. Although image data and audio information may be recorded simultaneously, a user may choose to view the images in a different order than they were acquired during the recording process. Because a user may navigate through the images in the captured multi-view interactive digital media representation in any order, the displayed visual representation of the scene may not be synchronized with playback of the recorded audio. Accordingly, there is a need for improved mechanisms and processes for integrating audio into a multi-view interactive digital media representation.

Overview

Provided are various mechanisms and processes relating to integrating audio into a multi-view interactive digital media representation.

In one aspect, which may include at least a portion of the subject matter of any of the preceding and/or following examples and aspects, one process includes retrieving a multi-view interactive digital media representation that includes numerous images fused together into content and context models. The process next includes retrieving and processing audio data to be integrated into the multi-view interactive digital media representation. A first segment of audio data may be associated with a first position in the multi-view interactive digital media representation. In other examples, a first segment of audio data may be associated with a visual position or the location of a camera in the multi-view interactive digital media representation. The audio data may be played in coordination with the multi-view interactive digital media representation based on a user's navigation through the multi-view interactive digital media representation, where the first segment is played when the first position or first visual position is reached.

In another aspect, which may include at least a portion of the subject matter of any of the preceding and/or following examples and aspects, a computer readable medium for integrating audio into a multi-view interactive digital media representation includes computer code for retrieving a multi-view interactive digital media representation that includes numerous images fused together into content and context models. The computer readable medium also includes computer code for retrieving and processing audio data to be integrated into the multi-view interactive digital media representation. Computer code for processing the audio data includes segmenting the audio data into a first segment and a second segment and associating the first segment with a first position in the multi-view interactive digital media representation and the second segment with a second position in the multi-view interactive digital media representation. The computer readable medium further includes computer code for playing the audio data in coordination with the multi-view interactive digital media representation based on a user's navigation through the multi-view interactive digital media representation, where the first segment is played when the first position in the multi-view interactive digital media representation is depicted and the second segment is played when the second position in multi-view interactive digital media representation is depicted.

In yet another aspect, which may include at least a portion of the subject matter of any of the preceding and/or following examples and aspects, a process for integrating audio into a multi-view interactive digital media representation includes retrieving a multi-view interactive digital media representation that includes a plurality of images fused together into a three dimensional model that is navigable by a user. The process further includes retrieving and processing audio data to be integrated into the multi-view interactive digital media representation. Processing the audio data includes segmenting the audio data into a first segment and a second segment and associating the first segment with a first position in the multi-view interactive digital media representation and the second segment with a second position in the multi-view interactive digital media representation. Next, the process includes playing the audio data in coordination with the multi-view interactive digital media representation based on a user's navigation through the multi-view interactive digital media representation. In particular, the first segment is played when the first position in the multi-view interactive digital media representation is depicted and the second segment is played when the second position in multi-view interactive digital media representation is depicted.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
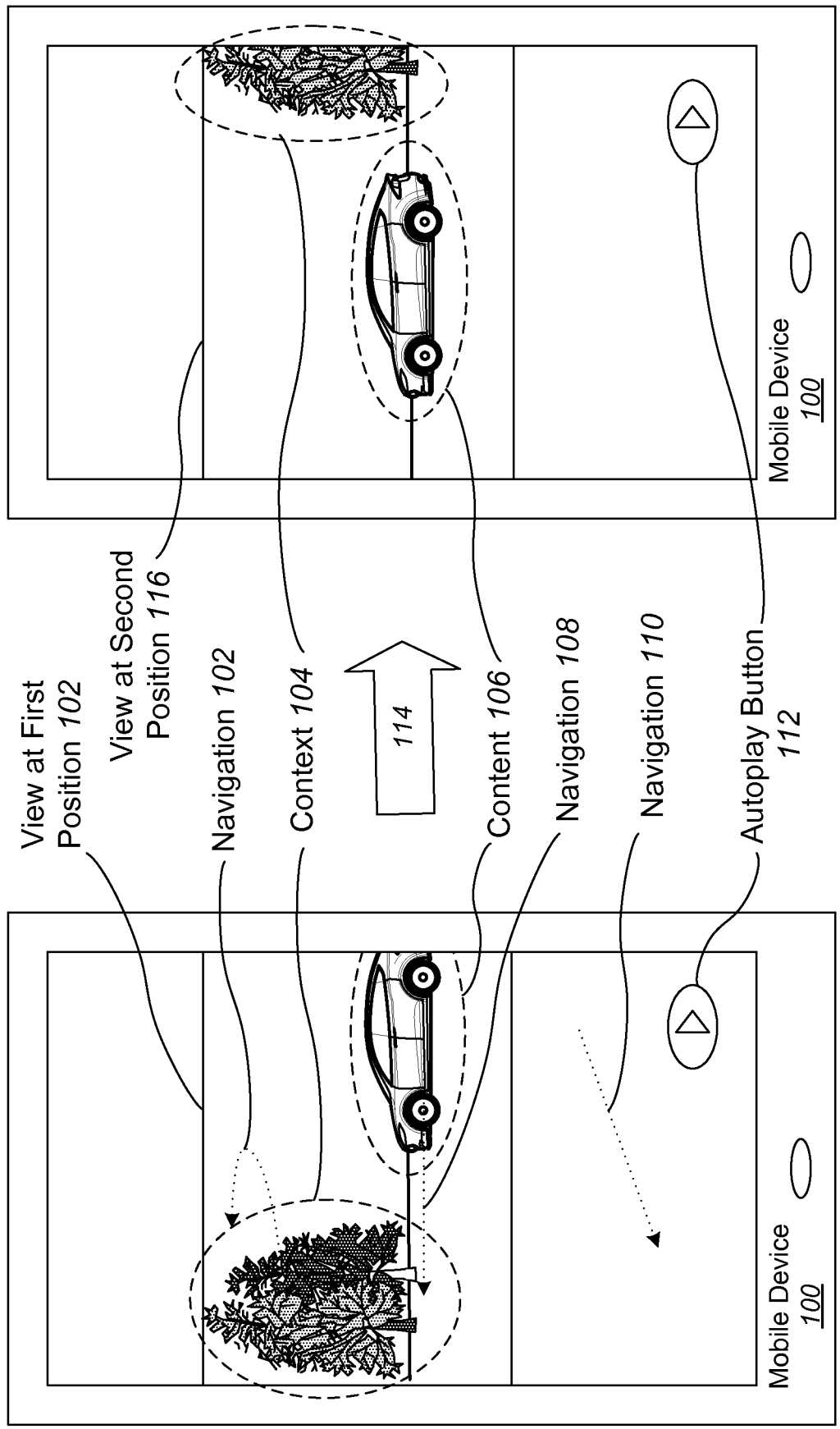
FIGS. 1A-1B illustrate an example of a navigation through a multi-view interactive digital media representation on a mobile device.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular audio segments and components. However, it should be noted that the techniques of the present invention can apply to one or more of any variety of different audio segments and components. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various three-dimensional (3D) media formats have developed with advances in technology, such as multi-view interactive media representations. These multi-view interactive digital media representations include formats such as surround views, multiview images, and 3D data formats. In these multi-view interactive digital media representations, a user can control how to view the image data. For instance, the user can navigate around various objects and select a viewpoint from which to view the image data.

Because users can navigate around various objects within multi-view interactive digital media representation, one problem is how to include audio information in this viewing process. Although image data and audio information may be recorded simultaneously, a user may choose to view the images in a different order than they were acquired during the recording process. Because a user may navigate through the images in the captured multi-view interactive digital media representation in any order, the displayed visual representation of the scene may not be synchronized with playback of the recorded audio. Various embodiments described herein relate to improved mechanisms and processes for integrating audio into a multi-view interactive digital media representation.

As described above, a multi-view interactive digital media representation can take numerous forms within the scope of this disclosure. For instance, a multi-view interactive digital media representation may include a surround view, multi-view image, or three dimensional model. Surround views are described in more detail with regard to U.S. patent application Ser. No. 14/530,669 by Holzer et al., filed on Oct. 31, 2014, titled "Analysis and Manipulation of Images and Video for Generation of Surround Views," which is incorporated by reference herein in its entirety and for all purposes. According to various embodiments described therein, a surround view provides a user with the ability to control the viewpoint of the visual information displayed on a screen. In addition, a surround view presents a user with an interactive and immersive active viewing experience.

According to various embodiments, the data used to generate a surround view can come from a variety of sources. In particular, data such as, but not limited to, two-dimensional (2D) images can be used to generate a surround view. These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, three-dimensional capture devices, a combination of devices, a combination of multidimensional capture devices, and the like.

According to one example, gathered data can be fused together. In some embodiments, a surround view can be generated by a combination of data that includes both 2D images and location information, without any depth images provided. In other embodiments, depth images and location information can be used together. Various combinations of image data can be used with location information, depending on the application and available data.

In the present example, the data that has been fused together is then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional model in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a surround view can be generated without a user specified target in some applications.

According to various embodiments, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

Although various embodiments described herein may include references to surround views, other types of multi-view interactive digital media representations are also intended to be included. For instance, representations such as a multi-view image, three dimensional model, or other formats can be integrated with audio data. For instance, a multi-view image or three dimensional model may include navigation capabilities, views of the subject matter from various viewpoints, etc. In these representations, content and context need not necessarily be separated.

With reference to FIGS. 1A-1B, shown is an example of a navigation through a multi-view interactive digital media representation on a mobile device. Specifically, a mobile device 100 is shown at two different navigation points. In FIG. 1A a view of a multi-view interactive digital media representation at a first position 102 is shown. A car is featured as content 106, and some trees are shown as context 104. In some embodiments, the multi-view interactive digital media representation can be played automatically from this position 102 if the user presses the autoplay button 112. Such automatic play may include a predetermined navigation through the multi-view interactive digital media representation. In other embodiments, the autoplay button 112 may play an audio track while the user navigates manually through the multi-view interactive digital media representation. Additional buttons or navigation tools can also be included.

In the present example, various navigations are available to the user. For instance, the user can browse through the multi-view interactive digital media representation by swiping around the trees using navigation 102. This may involve a rotation around the trees to reach a new viewpoint behind the car. The user can also browse through the multi-view interactive digital media representation by dragging the car to the left of the screen using navigation 108. In this case, the car would move to the left and the scenery around the car would also shift relative to the car. Yet another example of browsing includes the user swiping in the direction of navigation 110 to move the viewpoint of the scene. The car would then be viewed at a different angle and the scenery surrounding this viewpoint would also shift. Endless possibilities for navigating through the multi-view interactive digital media representation are possible.

In the present example, pressing the autoplay button 112 shows the car moving from right to left in the scene and the scenery moving relative to the car. FIG. 1B shows a view at second position 116 once the scene has progressed 114 in the automatic playback. As shown, the content 106 has shifted relative to the context 104. Although the present example shows the visual playback of the scene based on the user's navigation through the multi-view interactive digital media representation, the audio data accompanying this visual playback will be described in more detail below with particular reference to FIGS. 3A-3C. It should be noted that audio data may be attached to either position of an object or the position of a capture device. Video object position refers to position of an object such as a thing or entity or person in a surround view. Video capture position refers to the position of the capture device. Both can be used for triggering playback and/or positioning the audio data. Position may also include different angles, perspectives, geographic locations, etc. According to various embodiments, a surround view of a piano may be depicted where the keys of the piano are the dominant elements and an audio file is attached to any piano key location. Therefore, someone can play a piano by touching the corresponding keys and navigating through the piano keys in the surround view.

In other examples, a panoramic surround view includes a car that is driving by. In the background there are trees with chirping birds and the ocean with waves crashing on the shore. The audio data that is recorded is decomposed into the sound of the car, the sound of the birds, and the sound of the waves and the audio files are attached to the locations of those elements in the visual data. In still other examples, a surround view of a person includes a person making a face at a specific camera position within the surround view. An audio file is automatically played when that camera position is reached while navigating through the surround view.

Figure 2:
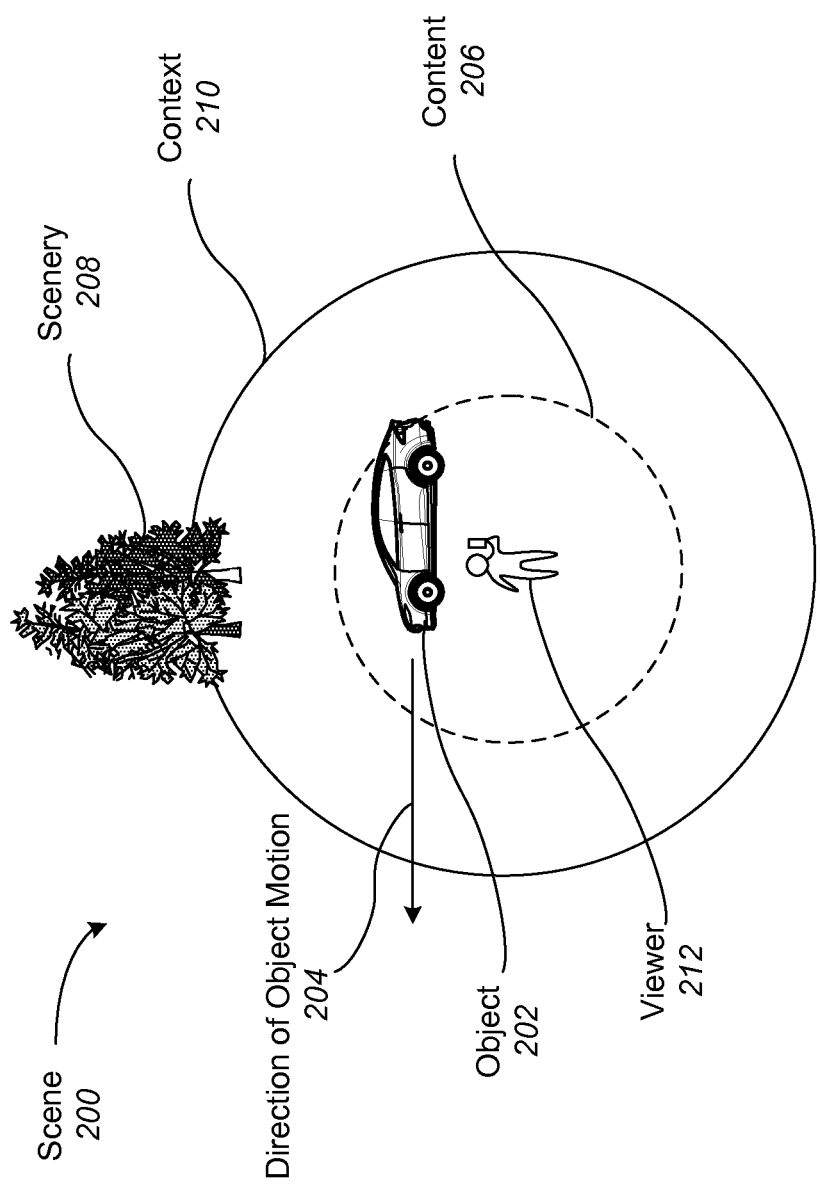
FIG. 2 illustrates an example of content and context of a multi-view interactive digital media representation.

In the present example, a particular multi-view interactive digital media representation is depicted with a car as content 106 and the trees as context 104. With reference to FIG. 2, shown is a depiction of content and context in the multi-view interactive digital media representation described with regard to FIGS. 1A-1B. In particular, FIG. 2 illustrates one example of separation of content and context in a scene 200. In the present example, the viewer 212 is shown viewing or capturing images of an object of interest, such as the car shown.

According to various embodiments, the digital visual data included in a scene 200 can be, semantically and/or practically, separated into content 206 and context 210, especially in the implementation of surround views. According to particular embodiments, content 206 can include the object(s), person(s), or scene(s) of interest while the context 210 represents the remaining elements of the scene surrounding the content 206. In the present example, the object 202 is a car. This object 202 constitutes the content 206 of the scene 200. The trees in the scenery 208 constitute the context. In some examples, a surround view may represent the content 206 as three-dimensional data, and the context 210 as a two-dimensional panoramic background. In other examples, a surround view may represent both the content 206 and context 210 as two-dimensional panoramic scenes. In yet other examples, content 206 and context 210 may include three-dimensional components or aspects. In particular embodiments, the way that the surround view depicts content 206 and context 210 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 206 and the context 210 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

Figure 3A:
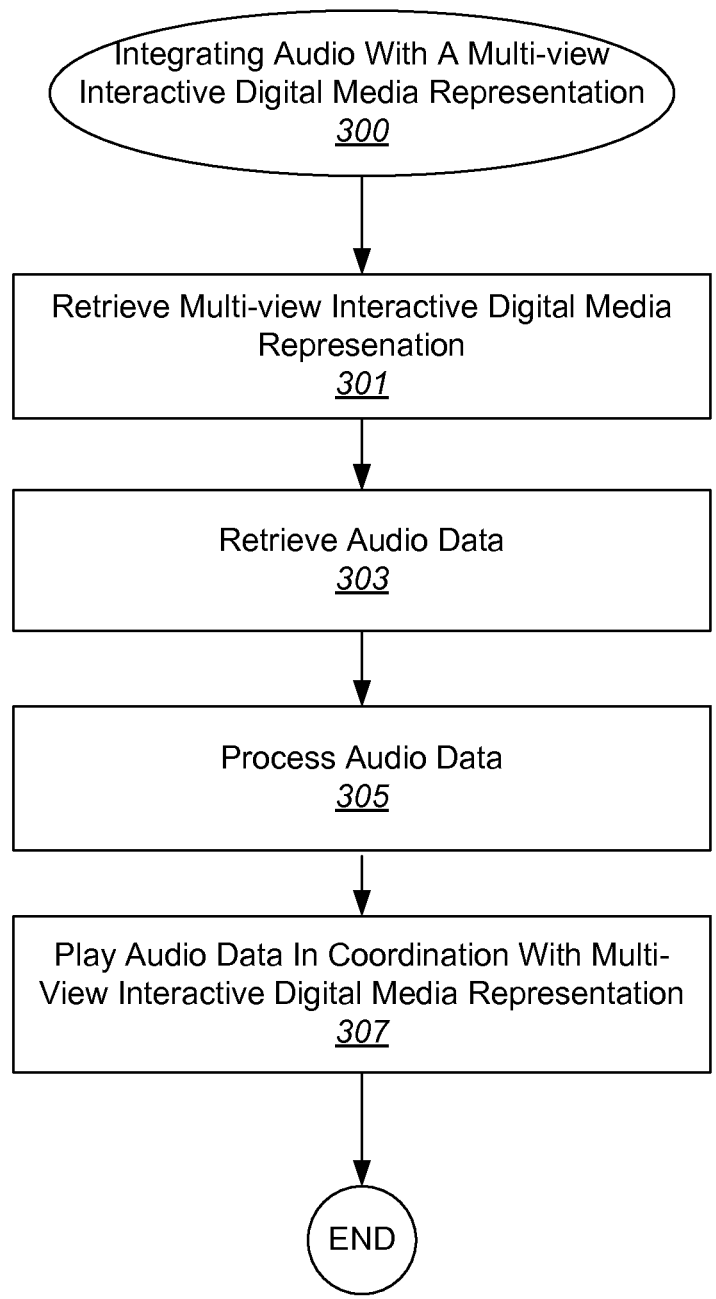
FIG. 3A illustrates an example of a process for integrating audio with a multi-view interactive digital media representation.

With reference to FIG. 3A, shown is an example of a process for integrating audio with a multi-view interactive digital media representation. In particular, the process 300 includes retrieving a multi-view interactive digital media representation at 301. As described above, the multi-view interactive digital media representation can include formats such as a surround view, multi-view image, or three dimensional model. In some examples, the multi-view interactive digital media representation includes numerous images fused together into content and context models, where the content model includes an object and the context model includes scenery surrounding the object.

In the present example, the process 300 continues by retrieving audio data to be integrated into the multi-view interactive digital media representation at 303. The audio data can be obtained in a variety of ways depending on the application or desired effect. For instance, an audio stream can be recorded together (i.e., at the same time) with the recording of the visual data included in the multi-view interactive digital media representation. In another example, an audio stream can be recorded separately from the visual data. One or more audio recordings can be created to use with the visual data. In other examples, pre-recorded audio files can be used. For instance, the user may have recorded this audio data at an earlier time or may use one or more existing audio files from the Internet or other sources. Some examples of audio files that may be used include musical recordings, sound effects, ambient noise or sounds, voice recordings, etc. A variety of effects can be applied in the processing step. Examples of effects include changing the pitch or introducing an echo effect.

In the present example, the process 300 further includes processing the audio data at 305. In particular, after an audio file has been recorded or selected it has to be processed in order to be integrated into the format of the multi-view interactive digital media representation. Several options for processing are possible, one or more of which can be combined in some examples. In one example, the recorded/selected audio file is directly used without processing. In another example, the recorded/selected audio file is decomposed into different components. For instance, voices are separated from background sounds, and different sound sources are separated (e.g. cars, ocean, birds, talking). This decomposition can be implemented in a variety of ways. One way includes using independent component analysis. Once the audio file is decomposed into different components, the separate audio streams are then either presented to the user for further selection and positioning or automatically assigned to locations in the multi-view interactive digital media representation corresponding to where they originated (i.e. locations of the original audio if the audio was recorded with the video). More details relating to the positioning of audio streams within the multi-view interactive digital media representation are discussed below with regard to audio playback at 307. Additionally, a particular example of processing audio data is described in conjunction with FIG. 3B.

Once the audio data is processed, the audio data is then played in coordination with the multi-view interactive digital media representation at 307. The playback of the audio data can be done in several ways. In one example, the audio data is played once as soon as the multi-view interactive digital media representation is loaded and displayed. In some instances, the audio data is played while the user navigates through the multi-view interactive digital media representation and the audio data is played at original speed during this navigation, independent of navigation direction or speed. In other instances, the audio data is played while the multi-view interactive digital media representation follows a predetermined auto play sequence. In yet other instances, audio and image data are initially played (once or multiple times) without user interaction available. Once this initial play is over, the user can manually navigate through the multi-view interactive digital media representation. In another example, the audio data is played repeatedly as soon as surround view is loaded and displayed. In some instances, the audio data is played repeatedly whether the user navigates the multi-view interactive digital media representation or the multi-view interactive digital media representation plays through an automatic playback sequence.

In some examples, the audio data is played in conjunction with navigation through the multi-view interactive digital media representation. For instance, navigating in one direction plays the audio forward and navigating in the other direction plays the audio backwards. In some instances, the speed of audio playback corresponds to navigation speed.

Another option for audio playback includes playing the audio data when a "Play" button is pressed or otherwise selected. For instance, as shown in FIGS. 1A-1B, an autoplay button 112 can be located in a predefined position in a user interface and selection of this button can begin audio playback. In another instance, a play button can be positioned in a manner to follow the corresponding image data. In this instance, the play button can either be visible or invisible to the user. According to various embodiments, a play button can have standard shape (e.g., triangular) or follow the shape of a specific object/region in the scene (e.g. a bird, a car, etc.).

In other embodiments, audio playback is based on navigation through the multi-view interactive digital media representation. In one example, audio is played when a certain position/frame of the multi-view interactive digital media representation is reached during navigation, whether manual or automatic. In some examples, audio data is associated with specific positions or frames in the multi-view interactive digital media representation. The closer the user navigates towards these positions or frames, the louder the corresponding audio plays. In particular examples, audio data can be "attached" to a 3D location in a scene and the volume of the audio playback depends on the distance and orientation of the current view point of the visualization. Specifically, the sound volume of an audio playback increases if the navigation location approaches the 3D location of the audio data. Similarly, the volume increases if the viewing direction of the navigation is oriented towards the location of the audio data and the volume decreases if the viewing direction of the navigation is oriented away from the location of the audio data.

Figure 4:
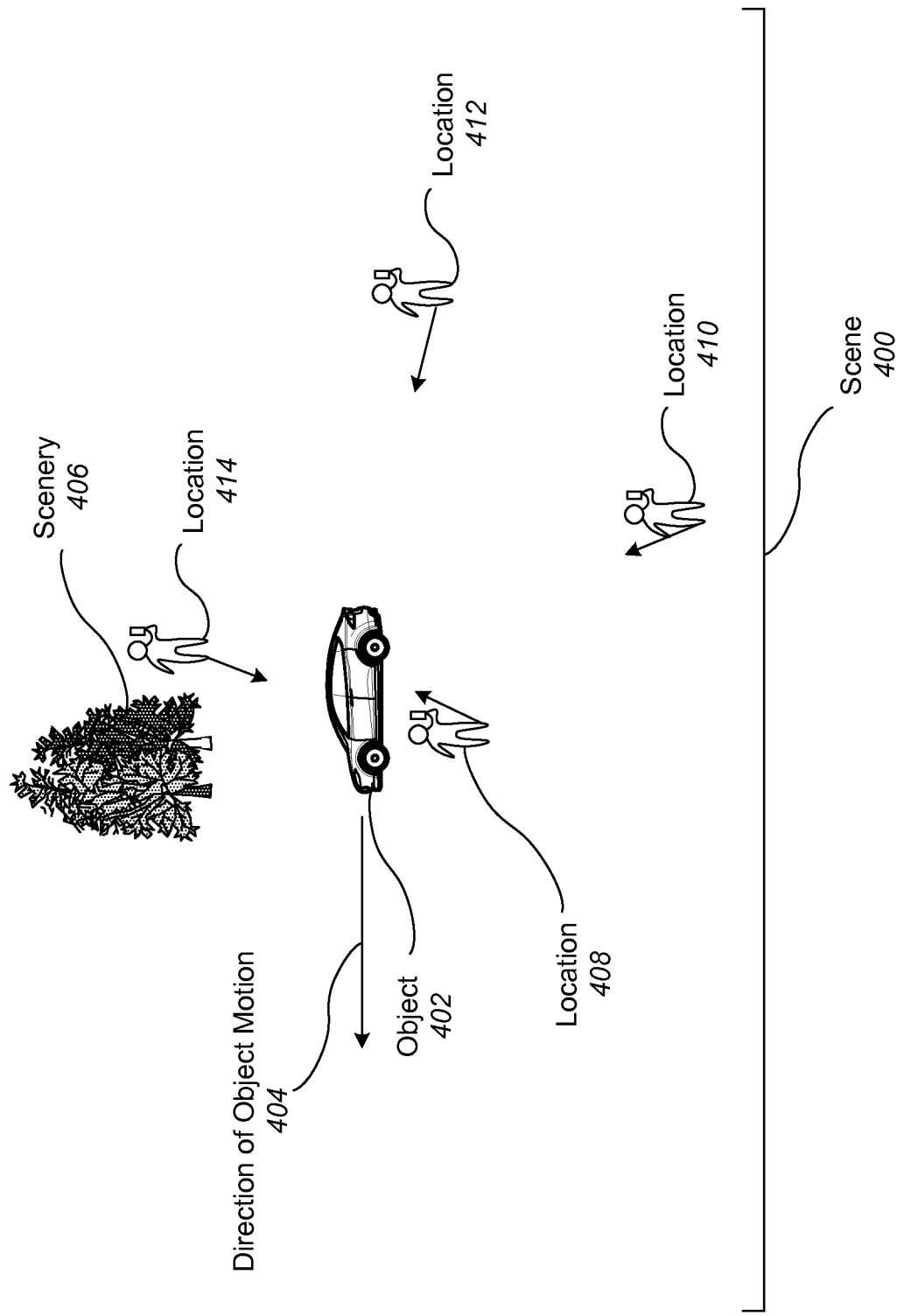
FIG. 4 illustrates an example of various viewpoints within a multi-view interactive digital media representation.

Referring to FIG. 4, shown is an example representation of a multi-view interactive digital media representation where the navigation location varies with respect to different objects in the scene 400. The object 402 moving in direction 404 may have associated sounds such as car revving and motor sounds. At navigation location 408, the viewpoint is directed towards the object 402 and the sound of the object 402 would be louder than when the navigation location is at any of the other locations 410, 412, or 414 as shown. When the navigation location 414 is selected, the sounds associated with the scenery 406 may be more audible, such as trees swaying in the wind. From this location, sounds from both the scenery 406 and the object 402 might be audible. In contrast, at navigation location 410, the scenery 406 sounds may not be audible and the sounds of the object 402 may be played at a lower volume because the location 410 is further away from the object 402.

Referring back to FIG. 3A, in some embodiments, the volume, pitch, and/or playback speed of audio data at 307 is dependent upon user input. For instance, swiping speed on a touch screen or by a mouseover or force applied to a force-sensitive touch pad can affect volume, pitch, and/or playback speed of audio data in some examples. In addition, rotational velocity, as measured by an inertial sensor, of a mobile device can affect volume, pitch, and/or playback speed of audio data in some examples.

Another option for audio playback is to play background music (e.g. a song) or sound effects while the user navigates through a multi-view interactive digital media representation. In some embodiments, the type or style of the background music can be correlated with the occurrence and strength of visual filters. For instance, detection of a beat in the music increases the strength of a filter or a different filter is applied if the style or type of the music changes. In some examples, the filters can be applied to correspond to the chosen background music. In other examples, the background music can be chosen based on any filters or effects included in the visual file. For instance, certain filters that make the visuals dark and murky may cause selection of darker songs or sound effects.

In some examples, audio playback in 307 can also occur during automatic playback of the multi-view interactive digital media representation. For instance, automatic playback may be initiated by user action such as selection of an autoplay button, as shown in FIGS. 1A-1B, automatically without user action, or in a video export. In some embodiments, one or more multi-view interactive digital media representations can be exported and synchronized with background music. Specifically, certain types of music can be correlated with certain types of multi-view interactive digital media representations. For instance, calm music can be correlated with scenic multi-view interactive digital media representations. In addition, the playback speed of a multi-view interactive digital media representation can be correlated with the type of music. In particular, calm music can be combined with slow playback of a multi-view interactive digital media representation.

In some embodiments, a switch between multi-view interactive digital media representations or a switch in the type of visualization or playback effects within a certain multi-view interactive digital media representation can happen when the style of the music changes or in synchronization with the occurrence of certain instruments or beats. In some examples, a change in the visualization direction within a multi-view interactive digital media representation occurs in synchronization with certain instruments or beats. In other examples, a change in the playback speed of the visual data may occur if the type of music changes or in synchronization with a certain instrument or beat. In yet other examples, the occurrence and strength of visual filters can correspond to the type of music and the occurrence of certain instruments. For instance, a beat increases the strength of a filter or a different filter is applied if the style or type of the music changes. In some embodiments, the user can define where and when the multi-view interactive digital media representations are switched and/or how the playback changes during automatic playback.

In particular embodiments, a combination of automatic playback and interactive navigation is possible. For example, a specific song can be played in the background and the current visible multi-view interactive digital media representation is switched at certain locations within the song, but the user is able to interactively navigate through the currently visible multi-view interactive digital media representation. In a converse example, a song can be played in the background and the user can switch between different multi-view interactive digital media representations, but the multi-view interactive digital media representations are autoplayed.

Figure 3B:
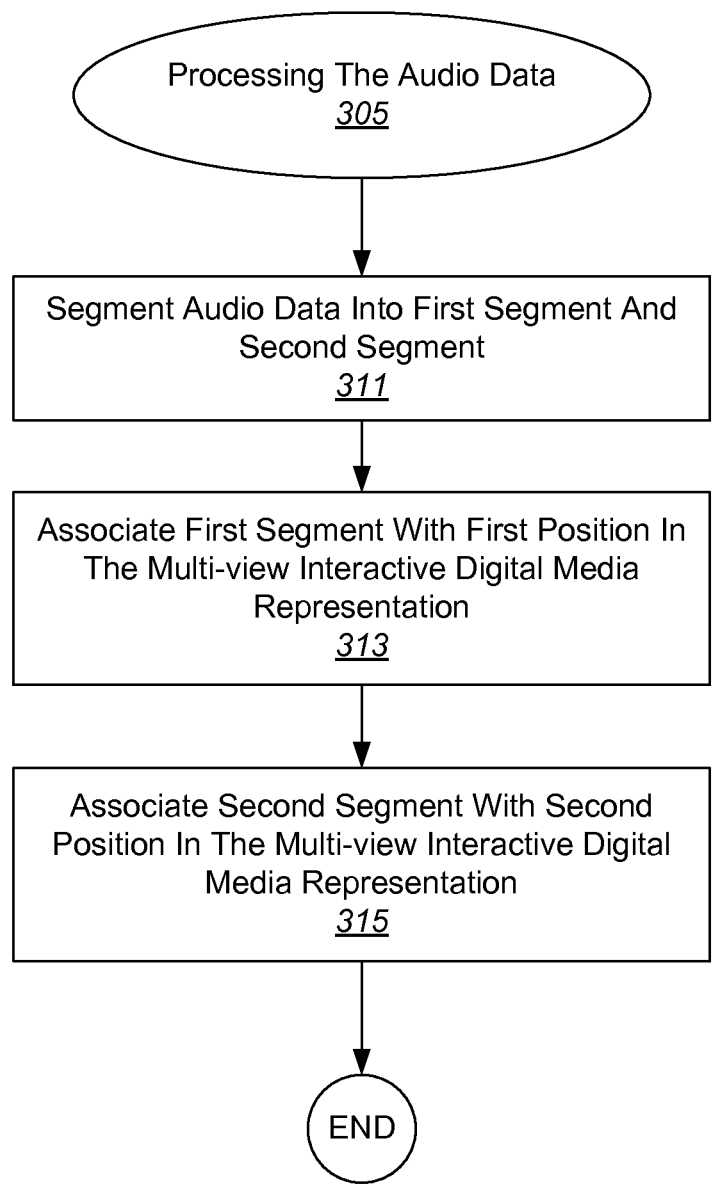
FIG. 3B illustrates an example of a process for processing an audio file to be integrated with a multi-view interactive digital media representation.
Figure 3C:
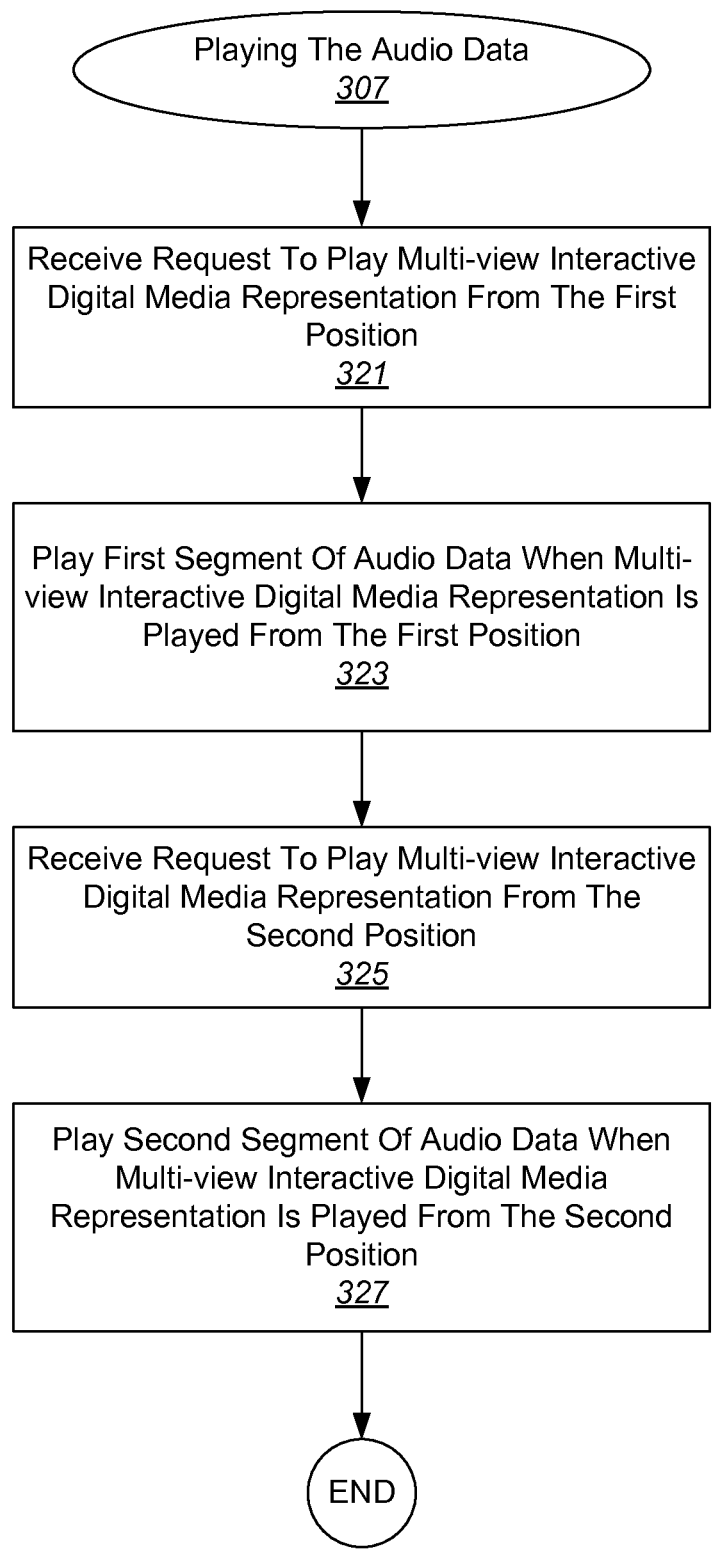
FIG. 3C illustrates an example of a process for playing an audio file integrated with a multi-view interactive digital media representation.

Although the above example describes various embodiments relating to integrating audio with a multi-view interactive digital media representation, FIGS. 3B and 3C include examples of particular embodiments of methods for processing audio data and playing the audio data in coordination with a multi-view interactive digital media representation. With reference to FIG. 3B, shown is an example of a particular method for processing an audio file to be integrated with a multi-view interactive digital media representation as referred to in step 305 of FIG. 3A. In the present example, processing the audio data 305 includes segmenting the audio data into a first segment and a second segment at 311. According to various embodiments, the first segment and second segment can be segmented from the audio data using independent component analysis. In the present example, the first segment includes a first set of sound sources and the second segment includes a second set of sound sources. For instance, the first set of sound sources may include voices and the second set of sound sources may include background noises. In another instance, the first segment may include sounds occurring near a first position in the multi-view interactive digital media representation, and the second segment may include sounds occurring near a second position in the multi-view interactive digital media representation.

Next, the first segment is associated with a first position in the multi-view interactive digital media representation at 313 and the second segment is associated with a second position in the multi-view interactive digital media representation at 315. In some instances, the first position is the same as the second position. In these cases, the first segment and second segment will overlap when played. In some examples, the first position and second position are located in separate places, but at least a portion of the first segment and second segment may overlap when played.

With reference to FIG. 3C, shown is a particular example of a process for playing an audio file integrated with a multi-view interactive digital media representation. According to various embodiments, the audio data is played back based on a user's navigation through the multi-view interactive digital media representation. In some examples, the first segment is played when the first position in the multi-view interactive digital media representation is played and the second segment is played when the second position in multi-view interactive digital media representation is played. In particular, playing the audio data 307 includes receiving a request to play a multi-view interactive digital media representation from the first position at 321. In response, the first segment of audio data is played when the multi-view interactive digital media representation is played from the first position at 323. Next, a request is received to play the multi-view interactive digital media representation from the second position at 325. In response, the second segment of audio data is played when the multi-view interactive digital media representation is played from the second position at 327.

According to various embodiments, the requests to navigate to the first position and second position can be made in numerous ways. In one example, a user's navigation through the multi-view interactive digital media representation includes selecting automatic playback, where automatic playback triggers play of a predetermined navigation through the multi-view interactive digital media representation. This predetermined navigation includes a set sequence of views and audio data that includes navigation to the first position and the second position. In another example, a user's navigation through the multi-view interactive digital media representation includes navigating to the first position and navigating to the second position. As described above with regard to FIG. 1A, the user can navigate to these positions through user input such as swiping a screen, manipulating a mouse or cursor, or tilting or otherwise moving a mobile device. In some embodiments, the first segment plays when the user navigates to the first position, and the volume of the first segment decreases as the user navigates away from the first position. Similarly, the volume of the first segment increases as the user navigates towards the first position.

Figure 5:
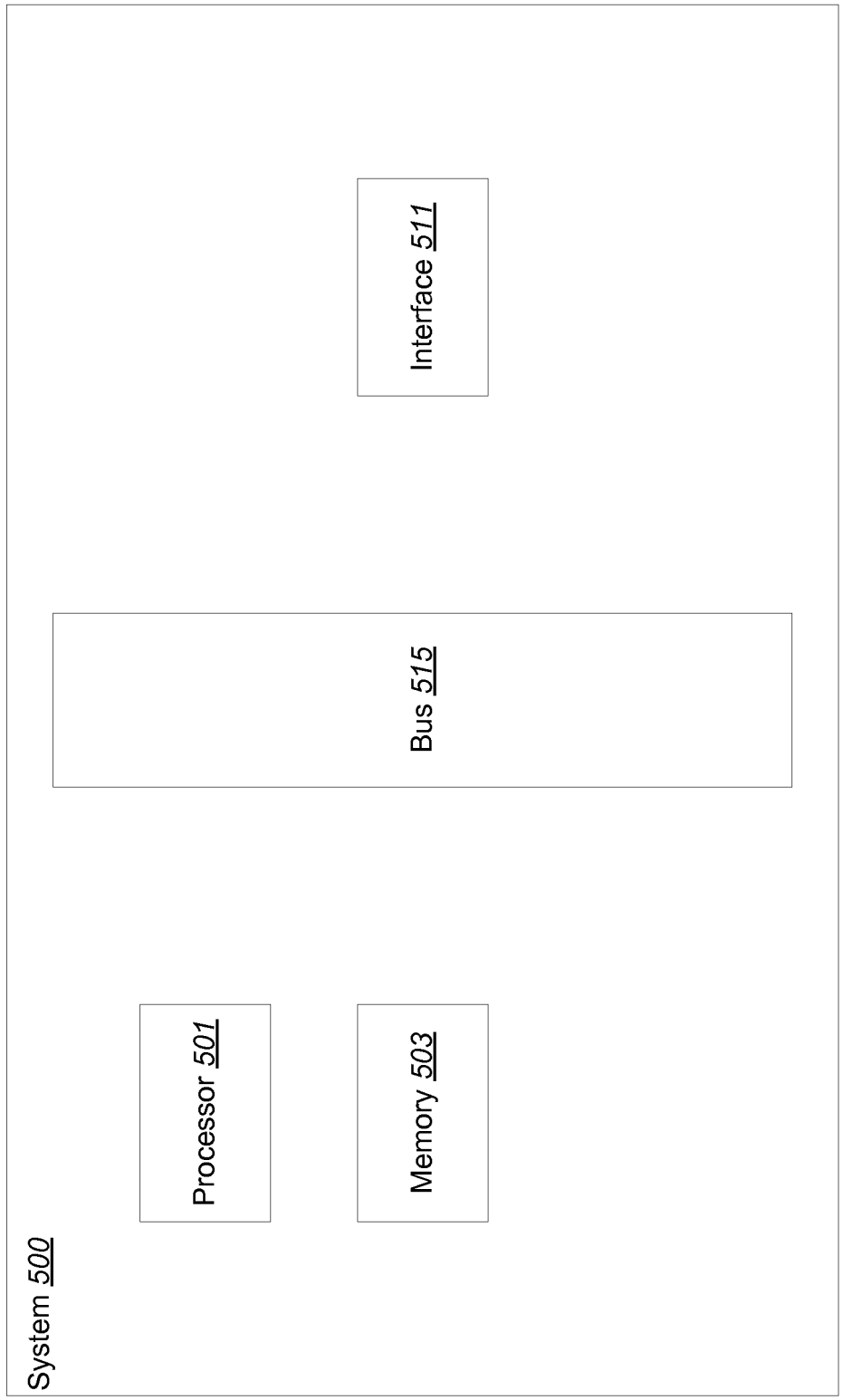
FIG. 5 illustrates a particular example of a computer system that can be used with various embodiments of the present invention.

Various computing devices can implement the methods described herein. For instance, a mobile device, computer system, etc. can be used to display a multi-view interactive digital media representation and the associated audio media. With reference to FIG. 5, shown is a particular example of a computer system that can be used to implement particular examples of the present invention. For instance, the computer system 500 can be used to display a multi-view interactive digital media representation and the associated audio data according to various embodiments described above. In addition, the computer system 500 shown can represent a computing system on a mobile device. According to particular example embodiments, a system 500 suitable for implementing particular embodiments of the present invention includes a processor 501, a memory 503, an interface 511, and a bus 515 (e.g., a PCI bus). The interface 511 may include separate input and output interfaces, or may be a unified interface supporting both operations. When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    retrieving a multi-view interactive digital media representation of image data, wherein the multi-view interactive digital media representation includes a plurality of two-dimensional (2D) images captured from a mobile device, wherein the 2D images are separated into content and context models which are fused together to render the multi-view interactive digital media representation navigable in one or more dimensions by selecting a viewpoint from a plurality of different viewpoints from which to view the image data, each viewpoint corresponding to a different frame in a plurality of frames associated with the multi-view interactive digital media representation, wherein the models are fused based in part on location information captured from an inertial measurement unit at the mobile device, wherein the content model includes an object and the context model includes scenery surrounding the object;

retrieving audio data to be integrated into the multi-view interactive digital media representation, wherein the audio data and the plurality of images are captured separately, and wherein the audio data can include a separate audio file recorded at a different time from the plurality of images;

attaching the audio data to specific frames in the multi-view interactive digital media representation, the specific frames corresponding to specific viewpoints of the multi-view interactive digital media representation such that certain portions of the audio are played when the specific frames in the multi-view interactive digital media representation are reached during navigation;

associating a first segment with a first position in the multi-view interactive digital media representation; and playing the audio data in coordination with the multi-view interactive digital media representation based on a user's navigation through the multi-view interactive digital media representation, wherein the first position in the multi-view interactive digital media representation triggers playback of the first segment, wherein the first position is a position of an object of a position of a capture device, wherein navigating the multi-view interactive digital media representation in one direction plays the audio data forward, navigating the multi-view interactive digital media representation in the opposite direction plays the audio data backwards, and the speed of playing the audio data corresponds to navigation speed.

2. The method of claim 1, wherein the audio data is processed to segment the audio data into the first segment and a second segment.

3. The method of claim 2, wherein the second segment is associated with a second position in the multi-view interactive digital media representation, wherein the second object position in the multi-view interactive digital media representation triggers playback of the second segment.

4. The method of claim 2, wherein the multi-view interactive digital media representation is a surround view.

5. The method of claim 2, wherein the multi-view interactive digital media representation is a multi-view image.

6. The method of claim 2, wherein the multi-view interactive digital media representation is a three dimensional model.

7. The method of claim 2, wherein the audio data includes an audio recording that was obtained concurrently with a recording of images included in the multi-view interactive digital media representation.

8. The method of claim 2, wherein the audio data is an audio recording that was obtained separately from images included in the multi-view interactive digital media representation.

9. The method of claim 2, wherein the audio data is a pre-recorded audio file.

10. The method of claim 2, wherein the first segment and second segment are extracted from the audio data using independent component analysis.

11. The method of claim 2, wherein the first segment includes a first set of sound sources and the second segment includes a second set of sound sources.

12. The method of claim 11, wherein the first set of sound sources includes voices and the second set of sound sources includes background noises.

13. The method of claim 11, wherein the first position is a video object position associated with a captured object in the surround view.

14. The method of claim 11, wherein the first position is a video capture position with the position of the capture device.

15. The method of claim 2, wherein the first segment includes sounds occurring near the first position in the multi-view interactive digital media representation, and wherein the second segment includes sounds occurring near the second position in the multi-view interactive digital media representation.

16. The method of claim 2, wherein the user's navigation through the multi-view interactive digital media representation includes selecting automatic playback, wherein automatic playback triggers play of a predetermined navigation through the multi-view interactive digital media representation, wherein the predetermined navigation includes a set sequence of views and audio data.

17. The method of claim 2, wherein the user's navigation through the multi-view interactive digital media representation includes navigating to the first position in the multi-view interactive digital media representation and navigating to the second position in the multi-view interactive digital media representation.

18. The method of claim 17, wherein the first segment plays when the user navigates to the first position, and wherein a volume of the first segment decreases as the user navigates away from the first position and wherein the volume of the first segment increases as the user navigates towards the first position.

19. A non-transitory computer readable medium comprising:

computer code for retrieving a multi-view interactive digital media representation of image data, wherein the multi-view interactive digital media representation includes a plurality of two-dimensional (2D) images captured from a mobile device, wherein the 2D images are separated into content and context models which are fused together to render the multi-view interactive digital media representation navigable in one or more dimensions by selecting a viewpoint from a plurality of different viewpoints from which to view the image data, each viewpoint corresponding to a different frame in a plurality of frames associated with the multi-view interactive digital media representation, wherein the models are fused based in part on location information captured from an inertial measurement unit at the mobile device, wherein the content model includes an object and the context model includes scenery surrounding the object;

computer code for retrieving audio data to be integrated into the multi-view interactive digital media representation, wherein the audio data and the plurality of images are captured separately, and wherein the audio data can include a separate audio file recorded at a different time from the plurality of images;

computer code for attaching the audio data to the multi-view interactive digital media representation such that a certain portion of the audio is played when a certain position or frame in the multi-view interactive digital media representation is reached during navigation;

computer code for associating the first segment with a first position in the multi-view interactive digital media representation; and computer code for playing the audio data in coordination with the multi-view interactive digital media representation based on a user's navigation through the multi-view interactive digital media representation, wherein the first position in the multi-view interactive digital media representation triggers playback of the first segment, wherein navigating the multi-view interactive digital media representation in one direction plays the audio data forward, navigating the multi-view interactive digital media representation in the opposite direction plays the audio data backwards, and the speed of playing the audio data corresponds to navigation speed.

20. A method comprising:

retrieving a multi-view interactive digital media representation of image data, wherein the multi-view interactive digital media representation includes a plurality of two-dimensional (2D) images captured from a mobile device, wherein the 2D images are separated into content and context models which are fused together to render the multi-view interactive digital media representation navigable in one or more dimensions by selecting a viewpoint from a plurality of different viewpoints from which to view the image data, each viewpoint corresponding to a different frame in a plurality of frames associated with the multi-view interactive digital media representation, wherein the models are fused based in part on location information captured from an inertial measurement unit at the mobile device, wherein the content model includes an object and the context model includes scenery surrounding the object;

retrieving audio data to be integrated into the multi-view interactive digital media representation, wherein the audio data and the plurality of images are captured separately, and wherein the audio data can include a separate audio file recorded at a different time from the plurality of images;

attaching the audio data to the multi-view interactive digital media representation such that a certain portion of the audio is played when a certain position or frame in the multi-view interactive digital media representation is reached during navigation;

processing the audio data, wherein processing the audio data includes segmenting the audio data into a first segment and a second segment and associating the first segment with a first position in the multi-view interactive digital media representation and the second segment with a second position in the multi-view interactive digital media representation; and playing the audio data in coordination with the multi-view interactive digital media representation based on a user's navigation through the multi-view interactive digital media representation, wherein the first segment is played when the first position in the multi-view interactive digital media representation is depicted and wherein the second segment is played when the second position in multi-view interactive digital media representation is depicted, wherein navigating the multi-view interactive digital media representation in one direction plays the audio data forward, navigating the multi-view interactive digital media representation in the opposite direction plays the audio data backwards, and the speed of playing the audio data corresponds to navigation speed.

* * * * *